US010977962B2

(12) United States Patent
Segall

(10) Patent No.: US 10,977,962 B2
(45) Date of Patent: *Apr. 13, 2021

(54) LATERAL CATHOTOMY AND CANTHOLYSIS SIMULATION DEVICE

(71) Applicant: Strategic Operations, Inc., San Diego, CA (US)

(72) Inventor: Stuart C. Segall, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,968

(22) Filed: Apr. 22, 2020

(65) Prior Publication Data

US 2020/0265755 A1   Aug. 20, 2020

Related U.S. Application Data

(63) Continuation of application No. 15/642,136, filed on Jul. 5, 2017, now Pat. No. 10,665,135, which is a continuation-in-part of application No. 15/345,008, filed on Nov. 7, 2016, now Pat. No. 10,325,524.

(60) Provisional application No. 62/252,458, filed on Nov. 7, 2015.

(51) Int. Cl.
*G09B 23/30* (2006.01)
*G09B 23/34* (2006.01)
*G09B 9/00* (2006.01)
*G09B 23/32* (2006.01)

(52) U.S. Cl.
CPC .............. *G09B 23/34* (2013.01); *G09B 9/00* (2013.01); *G09B 23/32* (2013.01)

(58) Field of Classification Search
CPC ................................ G09B 23/28; G09B 23/30
USPC .................. 434/262, 267, 270, 271, 272
See application file for complete search history.

(56) References Cited

U.S. PATENT DOCUMENTS

| 4,596,528 A * | 6/1986 | Lewis | G09B 23/30 434/270 |
|---|---|---|---|
| 8,821,166 B2 * | 9/2014 | Akura | G09B 23/28 434/271 |
| 10,360,815 B2 * | 7/2019 | Bernal | G16H 40/40 |
| 10,410,543 B2 * | 9/2019 | Gada | G09B 23/34 |
| 2005/0196741 A1 * | 9/2005 | Otto | G09B 23/28 434/271 |
| 2009/0111081 A1 * | 4/2009 | Nylen | G09B 23/34 434/271 |
| 2014/0038153 A1 * | 2/2014 | Courtoy | G09B 23/28 434/271 |

(Continued)

*Primary Examiner* — Kurt Fernstrom
(74) *Attorney, Agent, or Firm* — Enrique Monteagudo, Esq.

(57) ABSTRACT

The Lateral Canthotomy and Cantholysis Simulation Device of the present disclosure includes a base with a depression to receive a simulated eye, a skin covering, and a plug having a plug head and a plug band that is removably attached to the base under said skin covering, where the band is under tension between the first end and the second end to simulate a canthal tendon. The plug band is pulled through an opening formed into the skin covering and an opening formed into the base. A bending member is attached at one end to a stationary member and the other end to plug. The simulated eye is attached to a hook, which is used with the bending member to move to simulated eye away from the base to simulate proptosis. When plug band is cut, bending member moves to a relaxed configuration and simulated eye moves back towards base.

20 Claims, 20 Drawing Sheets

(56) References Cited

U.S. PATENT DOCUMENTS

| | | | |
|---|---|---|---|
| 2014/0356836 A1* | 12/2014 | Van Dalen | G09B 23/286 434/268 |
| 2015/0024364 A1* | 1/2015 | Lee | G09B 23/30 434/271 |
| 2015/0037775 A1* | 2/2015 | Ottensmeyer | G09B 23/30 434/271 |
| 2016/0098944 A1* | 4/2016 | Lin | G09B 23/32 434/271 |

* cited by examiner

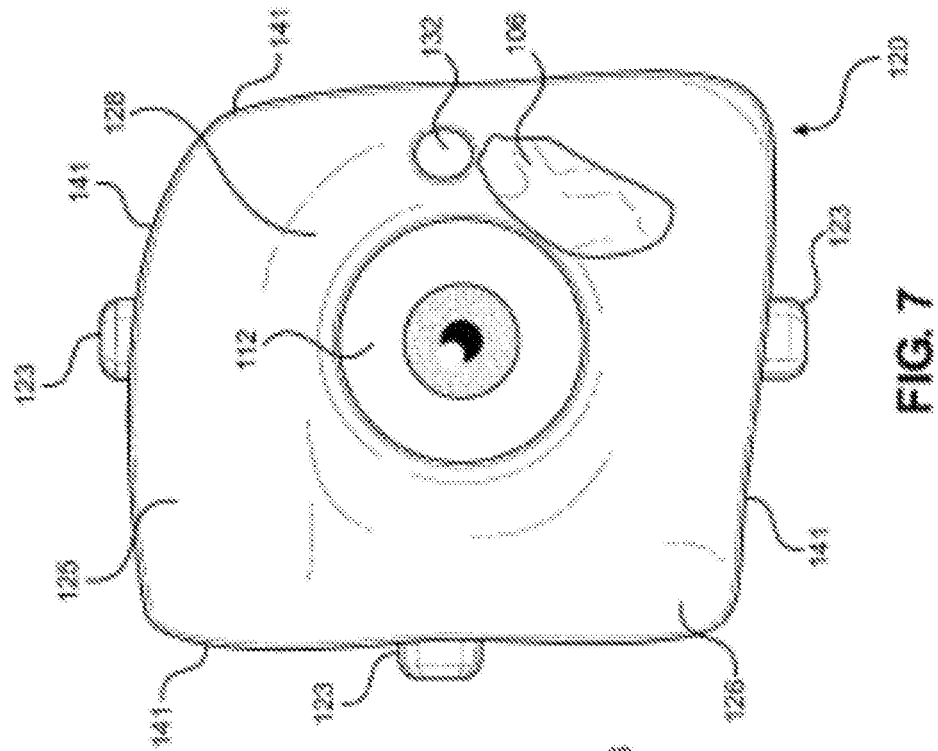

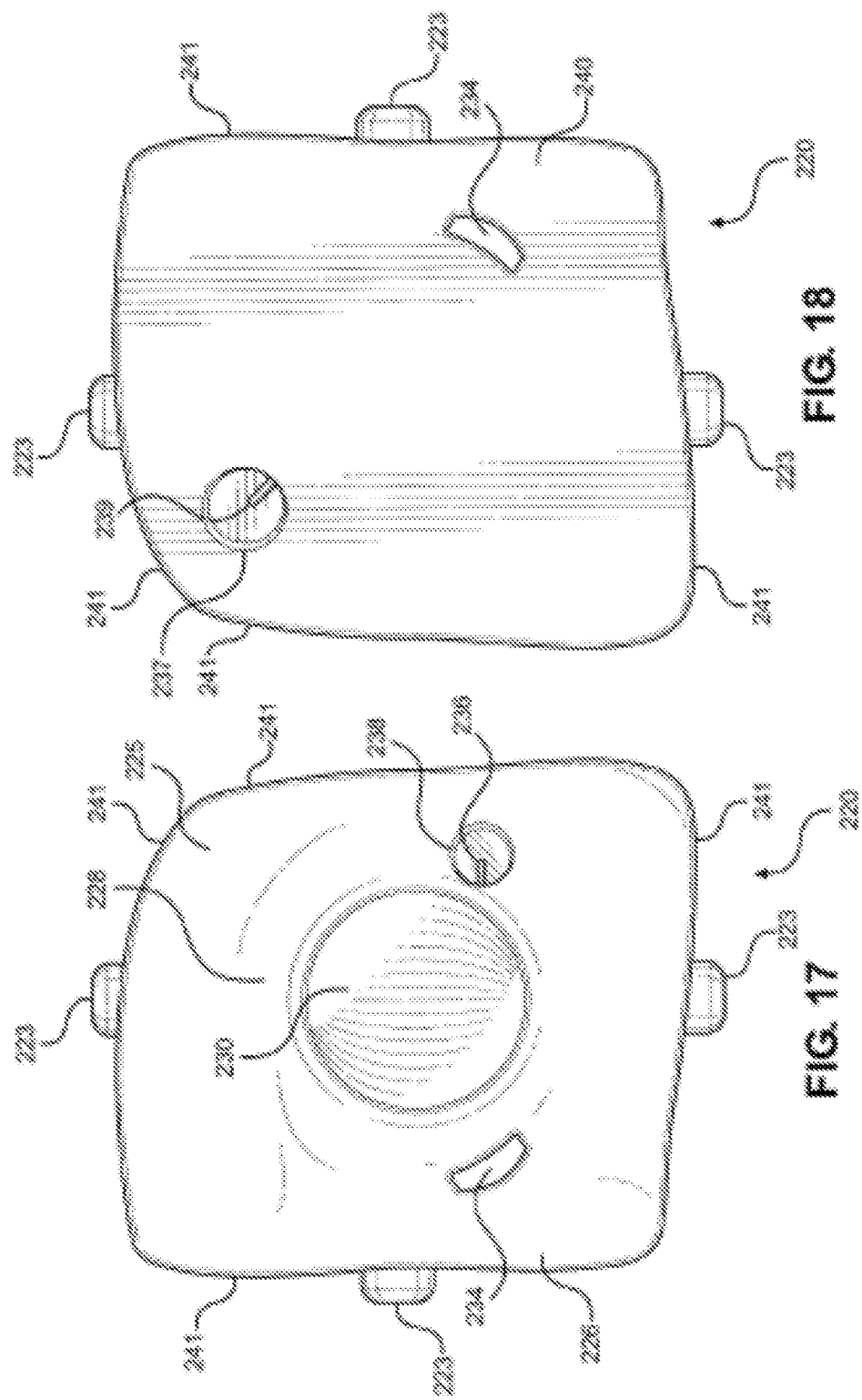

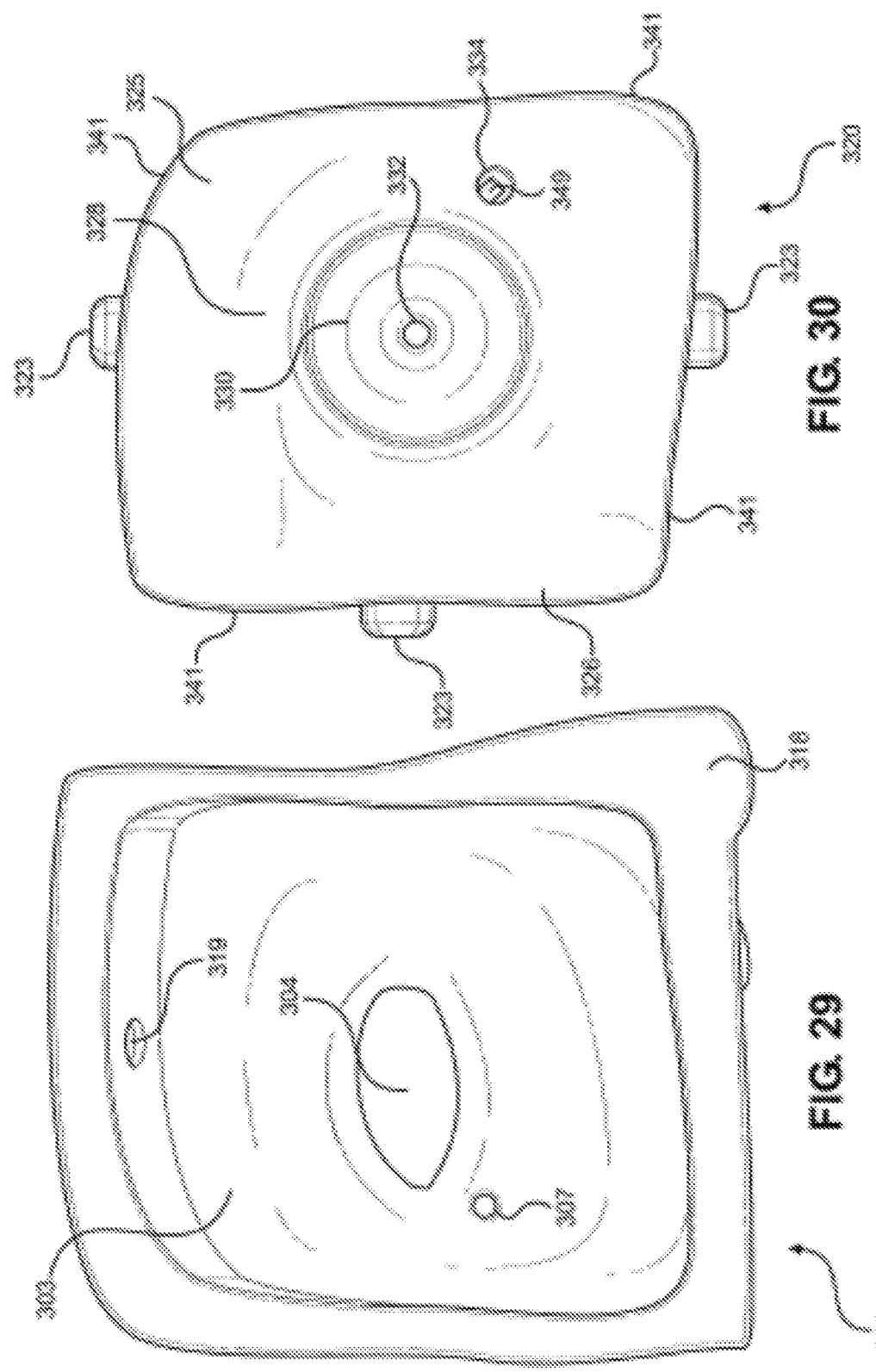

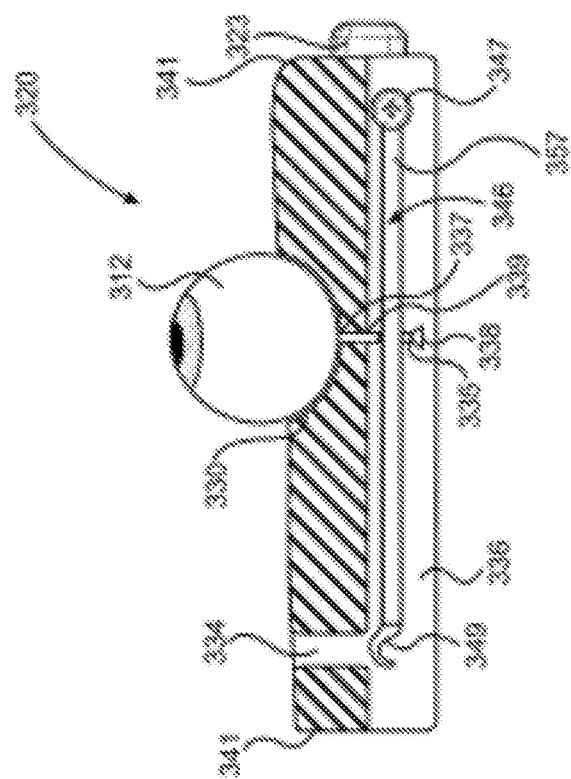
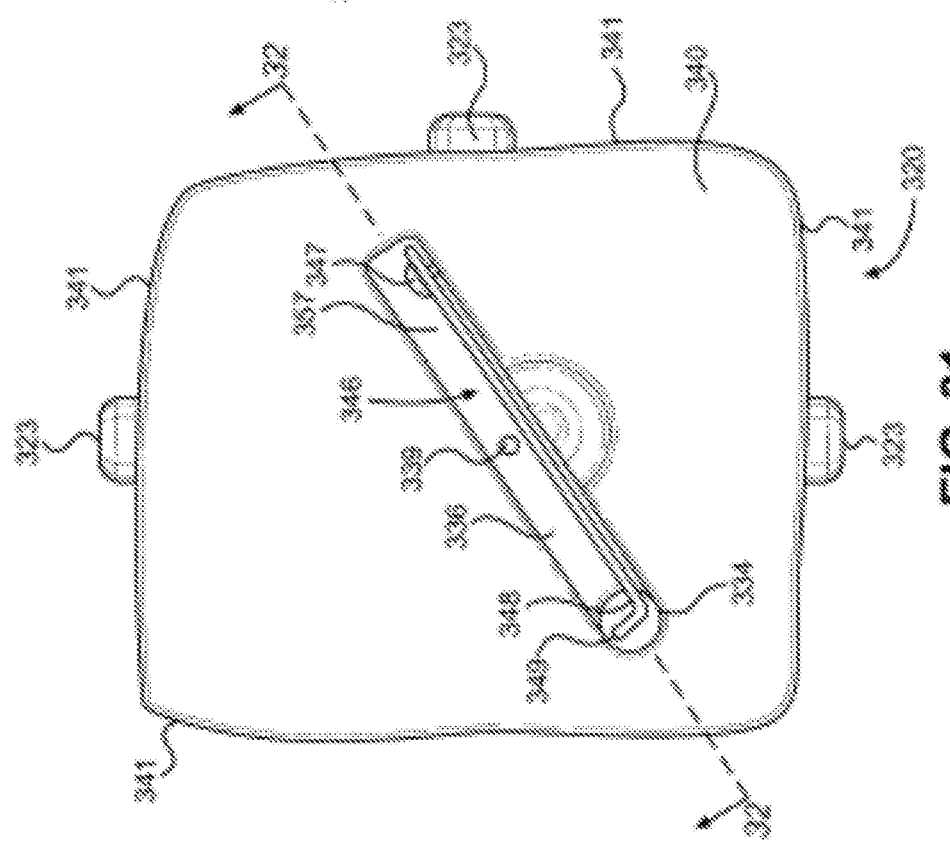
FIG. 32
FIG. 31

LATERAL CATHOTOMY AND CANTHOLYSIS SIMULATION DEVICE

CROSS-REFERENCE TO RELATED APPLICATION

This application is a continuation of currently pending U.S. patent application Ser. No. 15/642,136, filed Jul. 5, 2017 and entitled "Lateral Cathotomy And Cantholysis Simulation Device"; which is a continuation-in-part of U.S. patent application Ser. No. 15/345,008, filed Nov. 7, 2016 and entitled "Lateral Cathotomy And Cantholysis Simulation Device" which has issued as U.S. Pat. No. 10,325,524 on Jun. 18, 2019; and in turn claims benefit to U.S. provisional application No. 62/252,458 filed on Nov. 7, 2015; all of which are incorporated by reference herein in their entirety.

BACKGROUND OF THE INVENTION

Technical Field

The present disclosure generally pertains to medical training device, and is more particularly directed towards a device for ocular surgery training.

Related Art

The human eye is a photosensitive organ that focuses and converts light into electrical impulses. The back of the eye consists of a large chamber covered by a network of light sensing cells that are collectively called the retina. Leading posteriorly away from the eye is the optic nerve. The eye is positioned in the orbit, which is a cavity or socket of the skull. Seven bones conjoin to form the orbital structure and together are shaped like a quadrilateral pyramid. The eye is essentially suspended within the orbit and there are six muscles of the orbit that attach to the eye to facilitate movement. The lateral and medial canthal tendons attach the eyelids to the orbital rim and prevent the eye from having any forward displacement away from the eye socket. The canthus is the angular junction of the eyelids at either corner of the eyes.

There are many circumstances in which the eyes may be damaged, resulting in a loss of vision. A blunt impact to the eye may potentially damage the structures located in the "front" of the eye (such as the cornea, sclera, iris and lens) or to the back of the eye (the retina and the optic nerve). When a blunt impact to the eye occurs a hematoma may form. A hematoma, or localized collection of blood outside blood vessels, may develop in the tissue surrounding the eye and is commonly referred to as a "black eye." With minor injuries like a black eye, pooled blood usually drains towards the bottom of the eye after several days and no loss of vision occurs.

However, in some situations a blunt force can cause an orbital hemorrhage. A hemorrhage, in contrast with a hematoma, generally refers to a broken and bleeding blood vessel. The bleeding may occur internally or externally. In an orbital hemorrhage, the post-septal orbital space located behind the eye can accumulate blood, building pressure behind the eye. As discussed above, the orbital space is formed from seven bones that shape the socket and therefore, the accumulation of blood cannot expand posteriorly. As a result, anterior expansion occurs, causing proptosis (the forward displacement of the eye). Essentially, as the orbit fills with blood, the eye is pushed forward and out of the eye socket. However, the eye is tethered by the optic nerve and various tendons (including the lateral and medial canthal tendons).

As pressure builds, the ophthalmic artery, which supplies oxygenated blood to all structures within the orbit, is compromised and results in a vision-threatening, acute orbital compartment syndrome (OCS). The optic nerve may also be damaged by the direct pressure of the fluid building in the orbit and the compression of the vascular supply to the optic nerve. In addition, the retina may be damaged by prolonged retinal ischemia (restriction of blood supply to the retina). Without prompt and proper care, the optic nerve and the retina may be damaged beyond recovery in as little as 90-120 minutes.

To treat acute OCS, orbital decompression must take place in order to avoid damage to sensitive orbital contents, like the optic nerve. The most common method of orbital decompression is by preforming a lateral canthotomy and cantholysis (LCC). A canthotomy is generally the surgical exposure of the lateral canthal tendon (surgical incision of the canthus), and a cantholysis is generally the canthotomy plus incision of the inferior branch (crus) of the canthal tendon. Generally speaking, an LCC involves making an incision at the outer corner of the eyelids and then cutting the canthal tendon to release the eye.

In ideal situations, an ophthalmologist will perform the procedure in a hospital or other emergency medical facility. However, in many cases due to the time sensitive nature of the injury, many emergency room physicians have to perform an LCC without an ophthalmologist. In military or combat situations in remote areas, an ophthalmologist, hospital, or other emergency medical facility is likely unavailable. Due to the importance of prompt medical care to avoid any lasting damage to the patient's vision, the proper training of medical personnel would be beneficial to give on-site treatment in remote areas.

U.S. Pat. App. Pub. No. 20150279239 filed by Chang, et al. on Oct. 1, 2015 shows a device for ocular surgery training. The device for ocular surgery training relates to an ocular surgery training device, which includes an eye model having a hole at one side, and a catheter inserted into the hole, wherein a pressure sensor for measuring a pressure applied to the hole by the catheter is provided at one end of the catheter. The present invention may provide the ocular surgery training device which may enhance the skill of users in performing ocular surgery, thereby preventing complications.

The present disclosure is directed toward overcoming known problems and problems discovered by the inventor.

SUMMARY OF THE INVENTION

Aspects of the present disclosure generally pertain to towards a device for ocular surgery training. Aspects of the present disclosure more specifically are directed toward a device for lateral canthotomy and cantholysis training.

A device for ocular surgery training is disclosed herein. The device for ocular surgery training includes a simulated eye, a base configured to receive the simulated eye, a simulated skin, an eye displacer, and a band. The simulated skin is configured to attach to the base and at least partially cover the simulated eye, the simulated skin having an outward surface depicting an area immediately surrounding a human eye, the simulated skin includes an eye opening configured to expose at least a portion of the simulated eye through said eye opening when the simulated skin is attached to the base. The eye displacer is configured to displace the simulated eye from a first position to second position, the first position corresponding to an ocular injury and the second position indicating a properly performed ocular surgery. The band is configured to hold the simulated eye in the first position via the eye displacer when the band is intact, the band further configured to release the simulated eye from the first position when the band is severed, allowing the simulated eye to move to the second position via the eye displacer.

According to one embodiment, a device for ocular surgery training is also disclosed herein. The device for ocular surgery training includes a simulated eye, a base configured to receive the simulated eye, a simulated skin simulated skin, means to displace the simulated eye from a first position to second position, and a band. The first position corresponds to an ocular injury and the second position indicates a properly performed ocular surgery. The simulated skin is configured to attach to the base, the simulated skin includes an eye opening configured to expose at least a portion of the simulated eye when the simulated skin is attached to the base. The band is configured to hold the simulated eye in the first position via the means to displace the simulated eye when the band is intact, the band is further configured to release the simulated eye from the first position when the band is cut, allowing the simulated eye to move to the second position via the means to displace the simulated eye.

According to one embodiment, a device for lateral canthotomy and cantholysis training is also disclosed herein. The device includes a simulated eye, a base configured to receive the simulated eye, a simulated skin, an eye displacer, and a band. The simulated skin is configured to attach to the base and at least partially cover the simulated eye. The simulated skin has an outward surface depicting an area immediately surrounding a human eye and includes an eye opening and a simulated canthus. The eye opening is configured to expose at least a portion of the simulated eye through the eye opening when the simulated skin is attached to the base. The eye displacer is coupled to the base and configured to displace the simulated eye from a first position to second position. The first position corresponds to an injured eye and the second position corresponds to a properly performed ocular surgery. The band is configured to simulate a canthal tendon and to hold the simulated eye in the first position via the eye displacer when the band is intact. The band is further configured to release the simulated eye from the first position when the band is severed, allowing the simulated eye to move to the second position via the eye displacer.

BRIEF DESCRIPTION OF THE DRAWINGS

The nature, objects, and advantages of the present disclosure will become more apparent to those skilled in the art after considering the following detailed description in connection with the accompanying drawings, in which like reference numerals designate like parts throughout, and wherein:

FIG. 6 is a front view of the base of the lateral canthotomy and cantholysis simulation device, showing the brow bridge, nose bridge, simulated eye within the depression, circular opening, rectangular opening, a band inserted through the rectangular opening and attached to simulated debris, and detents, according to one embodiment of the disclosure.

FIG. 7 is a front view of the base of the lateral canthotomy and cantholysis simulation device, showing the brow bridge, nose bridge, simulated eye within the depression, circular hole, rectangular hole, simulated debris against the base, and detents, according to one embodiment of the disclosure.

FIG. 17 is a front view of the base of an alternative embodiment of the lateral canthotomy and cantholysis simulation device, showing a depression formed to receive a simulated eye, brow ridge, nose ridge, rectangular opening, detents, front bore, and front peg, according to one embodiment of the disclosure.

FIG. 18 is a back view of the base of the alternative embodiment of the lateral canthotomy and cantholysis simulation device, showing detents, rectangular opening, rear bore, and rear peg, according to one embodiment of the disclosure.

FIG. 29 is a back view of the simulated skin covering of an alternative embodiment of the lateral canthotomy and cantholysis simulation device, showing the partial nose, eye opening, indent, and first plug opening, according to one embodiment of the disclosure.

FIG. 30 is a front view of the base of an alternative embodiment of the lateral canthotomy and cantholysis simulation device, showing a depression formed to receive a simulated eye, hook aperture, brow ridge, nose ridge, second plug opening, and detents, according to one embodiment of the disclosure.

FIG. 31 is a back view of the base of the alternative embodiment of the lateral canthotomy and cantholysis simulation device, showing detents, cutout, stationary member, bending member, hole, and hook, according to one embodiment of the disclosure.

FIG. 32 is a cross-sectional view of FIG. 31 taken at line 32-32, showing the alternative embodiment of the lateral canthotomy and cantholysis simulation device in a relaxed configuration with cutout, second plug opening, bending member, stationary member, eye hook, aperture, eye hook, and simulated eye, according to one embodiment of the disclosure.

DETAILED DESCRIPTION

Figure 1:
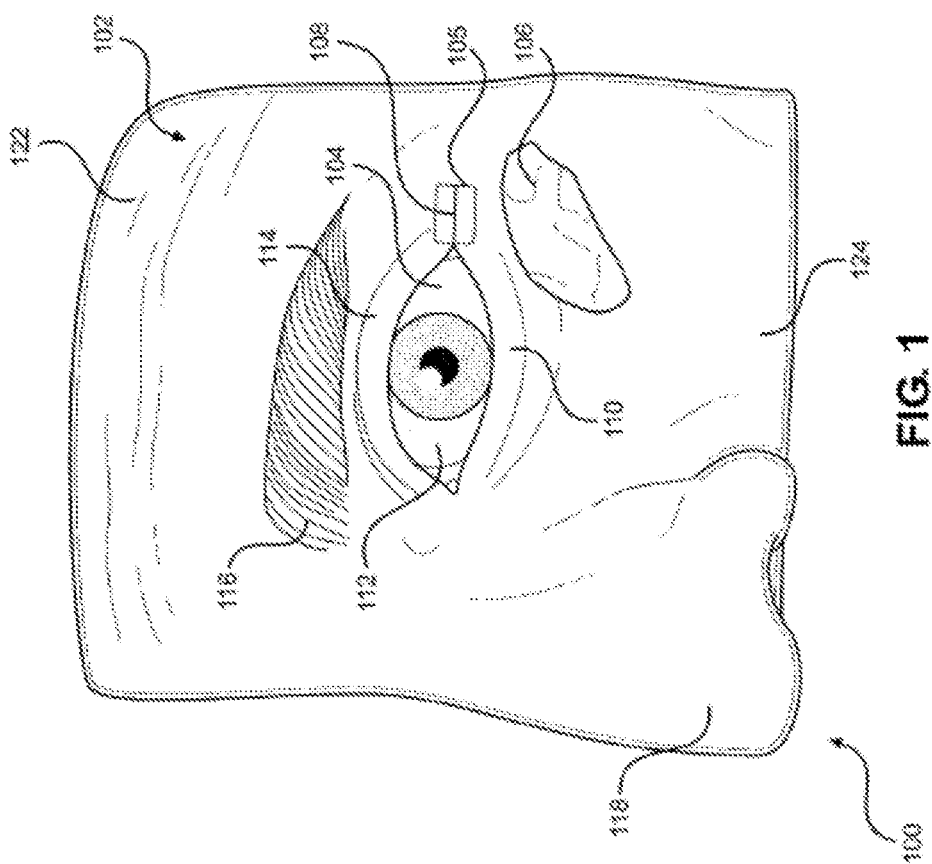
FIG. 1 is a front view of a lateral canthotomy and cantholysis simulation device, showing a simulated eye, skin covering, upper and lower eyelids, brow, partial nose, partial forehead, partial cheek, preformed incision with an adhesive covering, and simulated debris, according to one embodiment of the disclosure.

The present disclosure is a device for simulating an emergency lateral canthotomy and cantholysis in remote situations where a hospital or ophthalmologist is unavailable. Aspects of the present disclosure generally pertain to a Lateral Canthotomy and Cantholysis Simulation Device configured to provide training for professionals in the field to minimize irreversible damage and loss of vision when lateral canthotomy and cantholysis in a medical facility is not available.

Aspects of the present disclosure more specifically are directed toward a Lateral Canthotomy and Cantholysis Simulation Device including a base, a skin covering that mimics a partial face, and a first band attached on one end to an anchor, which may be formed to resemble debris, skin, hair or other objects. The base is substantially square in shape and formed with a brow bridge, nose bridge, and multiple openings.

In a preferred embodiment of the Lateral Canthotomy and Cantholysis Simulation Device of the present disclosure, the front of the base is formed with a depression to receive a simulated eye. One (1) circular and one (1) rectangular opening are formed into the base to the bottom right of the depression. The back of the base is formed with a bore and peg located in the upper right corner of the back of the base. The peripheral sides of the base are formed with detents used for securing the simulated skin covering.

The simulated skin covering includes a partial nose, brow, upper and lower eyelids, partial forehead, and partial cheek. The skin covering may also depict various wounds, such as cuts, burns, scrapes, etc. As with a real human eye, the skin covering does not cover the simulated eye entirely. Instead, the simulated eye is partially covered by the upper and lower eyelids of the skin covering. Indents to receive the detents from the base are also formed into the skin covering. The skin covering covers the base of the Lateral Canthotomy and Cantholysis Simulation Device of the present disclosure, including the peripheral sides of the base, but leaves the back of the base exposed. The skin covering is also formed with two (2) openings, corresponding to the circular and rectangular openings of the base, and a preformed incision.

To use the Lateral Canthotomy and Cantholysis Simulation Device of the present disclosure, a simulated eye is attached to the depression on the front of the base. The skin covering is placed over the base with the eye exposed. The end of first band not attached to simulated debris is threaded through the opening in the skin covering that corresponds to the rectangular opening located on the base at the bottom right of the simulated eye. The simulated debris is larger than both the opening formed into the skin covering and the rectangular opening on the base. Thus, simulated debris acts as an anchor, allowing the band to be stretched and secured to simulate tension like a tendon.

The first band is then pulled through the rectangular opening, exiting out of the back of the base. The first band is pulled and then secured on the peg located in the bore on the exposed back of the base. The first band is formed with multiple holes in order for the peg to secure the band.

The skin covering is also formed with a preformed incision in the lateral area of the eye. The preformed incision is covered with an adhesive strip. The adhesive strip allows the user to simulate a lateral canthotomy without cutting the skin covering directly, allowing the skin covering to be used multiple times.

A second band may also be threaded through the circular opening to simulate a different injury closer to the eye. The simulated face covering is placed over the base with the eye exposed. The second band is threaded through the opening in simulated skin covering that corresponds to the circular opening located on the base at the bottom right of the simulated eye. The simulated debris is larger than both the opening formed into the skin covering and the circular opening on the base. Thus, the simulated debris is anchored to the skin covering by the second band.

The second band exits through the circular opening on the back of the base and is then pulled to create tension to simulate the lateral canthal tendon. The second band is then secured on the peg located in the bore on the exposed back of the base. The second band is formed with multiple holes used to secure the band to the peg.

To perform the lateral canthotomy, the user uses tweezers to slightly pull away the lower lid of the skin covering and cut the adhesive strip along the preformed incision using blunt tipped scissors, if available. This simulates the lateral canthotomy, which is performed by cutting horizontally from the lateral part of the eyelid to the bony margin of the orbital rim.

To simulate performing a cantholysis, the user would take the tweezers to pull the lower eyelid away from the skin covering. Pulling the lower eyelid away from base, would expose first band in a tensioned state. The user then uses the same scissors to cut first band, simulating the cutting of the lateral canthal tendon. The same procedure would be used if the second band were used with the circular opening.

After use, the band and adhesive strip can be replaced, allowing the Lateral Canthotomy and Cantholysis Simulation Device of the present disclosure to be used repeatedly.

In another embodiment of the Lateral Canthotomy and Cantholysis Simulation Device of the present disclosure, the base is formed with a depression to receive a simulated eye, a rectangular opening located to the bottom left of the depression, and a front bore and front peg located to the bottom right of the depression. In addition, detents located on the peripheral sides of the base are used to secure the skin covering.

A band, preferably made of an elastic material, is formed with holes on each end of the band. One end of the band is secured on the front peg. The other end of the band is threaded through the rectangular opening and exists the opening on the back of the base. The band lies across the lower part of the simulated eye and mimics the canthal tendon. The band is secured in the back by a rear bore and rear peg located in the upper left corner of the back of the base.

The simulated skin covering includes a partial nose, brow, upper and lower eyelids, partial forehead, and partial cheek. The skin covering may also depict various wounds, such as cuts, burns, scrapes, etc. As with a real human eye, the skin covering does not cover the simulated eye entirely. Instead, the simulated eye is partially covered by the upper and lower eyelids of the skin covering. Also formed into the skin covering are indents to receive the detents from the base. The skin covering covers the base of the alternative embodiment of the Lateral Canthotomy and Cantholysis Simulation Device of the present disclosure, including the peripheral sides of the base, but leaves the back of the base exposed.

The skin covering is also formed with a preformed incision. The preformed incision is covered with an adhesive strip. The adhesive strip allows the user to simulate a lateral canthotomy without cutting the skin covering directly, allowing the skin covering to be used multiple times.

To perform the lateral canthotomy, the user uses tweezers to slightly pull away the lower lid of the skin covering from simulated eye and cut the adhesive strip along the premade incision using blunt tipped scissors, if available. This simulates the lateral canthotomy, which is performed by cutting horizontally from the lateral part of the eyelid to the bony margin of the orbital rim.

To simulate performing a cantholysis, the user would take the tweezers and gently peel back the lower lid of the skin covering at the preformed incision, exposing the band underneath skin covering. The other hand of the user would use scissors, to cut the exposed band. Cutting the band simulates the cutting of the lateral canthal tendon.

After use, the band and adhesive strip can be replaced, allowing the alternative embodiment of the Lateral Canthotomy and Cantholysis Simulation Device of the present disclosure to be used multiple times.

In another alternative embodiment of the Lateral Canthotomy and Cantholysis Simulation Device of the present disclosure, the device has a base covered by a skin covering. A plug is used to simulate the canthal tendon. The plug comprises a plug head and a plug band. The skin covering is formed with a plug head receiver and a first plug opening located on the lower lateral corner of the eye opening. The plug head receiver is a depression formed to receive the plug head.

The base is formed with a depression to receive the simulated eye and with an eye hook aperture located in the center of the depression. The eye hook aperture extends from the front side of the base to the back side of the base. The base is also formed with a second plug opening located on the bottom right of the depression on the front of the base. The second plug opening extends from the front side of the base to the back side of the base. Formed into the back side of base is a cutout, which houses the mechanism used to simulate the lateral canthotomy and cantholysis. The cutout extends from the second plug opening located on the lower left corner to the upper right corner of the back side of the base. The eye hook aperture extends from the front side to the back side of the base; opening up on the back side of the base at the cutout.

Within the cutout, a stationary member and a bending member are housed. The stationary member is fixedly attached to the cutout. The bending member is a long piece of thin metal, which is fixedly attached to the stationary member at the first end and the second end is formed with a hook. The bending member is also formed with a hole, which is configured to receive the eye hook.

When in a relaxed configuration, the simulated eye is directly adjacent to the depression. The simulated eye is attached to the eye hook; the eye hook having a first end and a second end. The first end is threaded through the bending member through a hole and through the eye hook aperture of base. The eye hook is then attached to the simulated eye by some mechanism, for example, adhesives or a screw mechanism. The hook end hooks around the bending member. Thus, because of the eye hook's position, the eye hook moves with the bending member depending on the configuration of the device and whether the device is in a tensioned or relaxed configuration.

In the relaxed configuration, the bending member is not bending in any direction and not experiencing any tension. In the relaxed configuration, the bending member keeps the simulated eye approximately directly adjacent to depression.

To use the device, the plug head is received by the plug head receiver. When in use, the plug head is flushed against the skin covering to simulate human skin as realistically as possible. The plug band is pulled through first plug opening of skin covering and through second plug opening formed into base. While the first end of the plug band is attached to the plug head, the second end of the plug band is formed with a plurality of hook receivers. The hook receivers receive hook of the bending member.

After the plug band is pulled through first plug opening of skin covering and then through second plug opening formed into base, the plug band is stretched and the bending member bends towards the plug band from stationary member, which serves as a stationary axis, to allow the hook to be received within the hook receivers. The plug head prevents the plug from being pulled through the first plug opening. This is the tensioned configuration of the alternative embodiment of the Lateral Canthotomy and Cantholysis Simulation Device.

A preferred method for performing the lateral canthotomy and cantholysis requires the user to peel the lower lid away from the simulated eye using a tweezer of other device, exposing the plug band between the skin covering and base. The plug band is then cut to simulate cutting the canthal tendon. When the plug band is cut, the alternative embodiment of the Lateral Canthotomy and Cantholysis Simulation Device changes from a tensioned configuration to a relaxed configuration. Cutting the plug band releases the tension in the bending member and the bending member moves back into its original and relaxed position. Because the eye hook is threaded through the bending member, when the bending member moves back into a relaxed configuration, the simulated eye moves back towards the depression, simulating the release of the fluid buildup behind the eye, which caused the proptosis.

After the simulated lateral canthotomy and cantholysis is performed, the plug is removed and discarded. Because the plug can be used, discarded, and replaced with a new plug, the alternative embodiment of the Lateral Canthotomy and Cantholysis Simulation Device of the present disclosure can be used repeatedly without requiring replacement of skin covering or base.

Referring initially to FIG. 1, a preferred embodiment of the Lateral Canthotomy and Cantholysis Simulation Device of the present disclosure is shown and generally designated 100. The Lateral Canthotomy and Cantholysis Simulation Device 100 having a base 120 (shown in detail in FIGS. 4 and 5) covered by a skin covering 102.

The skin covering 102 depicts an upper right corner of a human face, including a partial forehead 122, brow 116, partial cheek 124, and partial nose 118. The bottom lid 110 and upper lid 114 of the skin covering 102 form an eye opening 104 where the simulated eye 112 is partially exposed. While a preferred embodiment of the Lateral Canthotomy and Cantholysis Simulation Device 100 includes a skin covering 102 that shows only a portion of a face, any portion of the human face may be used, so long as it includes a simulated eye 112 or any depiction of the human eye and area immediately surrounding the human eye.

The skin covering 102 is made of synthetic skin material, including but not limited to, silicone, rubber or neoprene. The skin covering 102 is used to simulate a realistic patient in both touch and sight, and may be pigmented to make the skin covering 102 more realistic. The skin covering 102 may be made of multiple layers to simulate various layers that comprise human skin. In addition, the skin covering 102 may include various simulated injuries, including, but not limited to, scrapes, cuts, burns, wounds, etc.

In a preferred embodiment, the skin covering 102 includes a preformed incision 108 at the lateral corner of the simulated eye 112, where the upper lid 114 and lower lid 110 of the skin covering 102 meet. The preformed incision 108 is used to simulate the incision made at the lateral corner of a patient's eye. The adhesive strip 105 holds the preformed incision 108 together and gives the user the opportunity to simulate cutting the lateral corner without having to replace the skin covering 102 after a single use. Adhesive strip 105 can made of a variety of materials, including, but not limited to, plastic, silicone, paper, etc. The adhesive strip 105 also need not be adhesive. For example, the adhesive strip 105 may be made of Velcro® and the skin covering 102 may have a corresponding Velcro® area around the preformed incision 108.

After the simulated lateral canthotomy and cantholysis is performed, the adhesive strip 105 can be removed, discarded, and replaced with a new adhesive strip 105. Although shown with a preformed incision 108, the Lateral Canthotomy and Cantholysis Simulation Device 100 of the present disclosure may not have a preformed incision 108, allowing the user to perform the lateral canthotomy directly on the skin covering 102.

Figure 8:
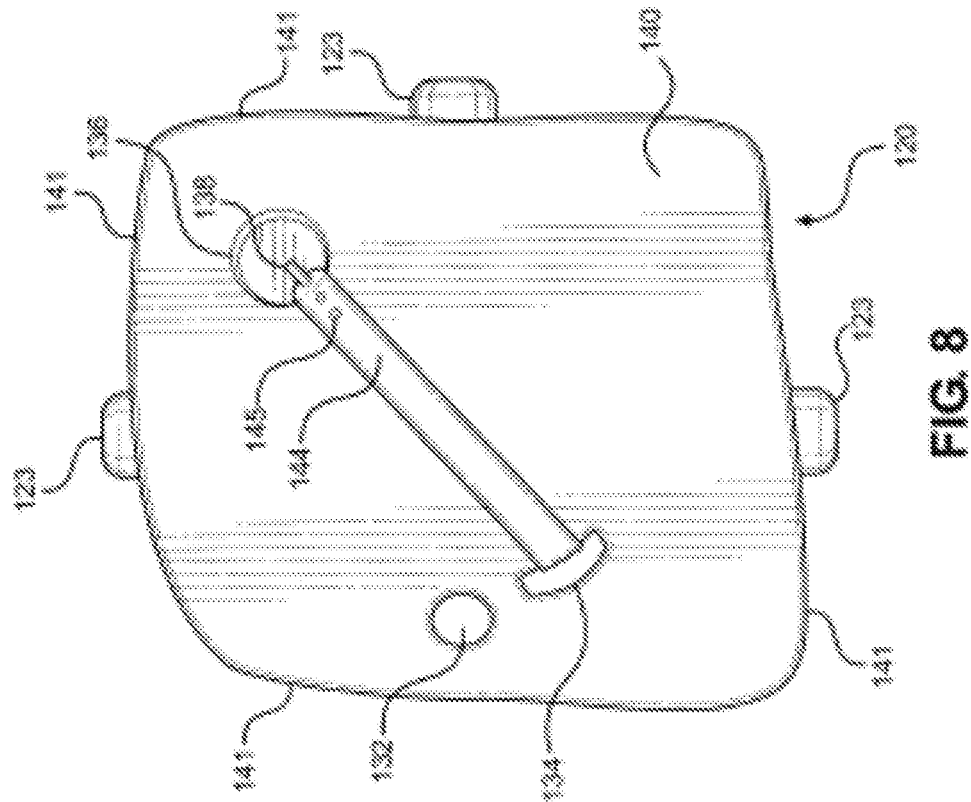
FIG. 8 is a back view of the base of the lateral canthotomy and cantholysis simulation device, showing the circular opening, rectangular opening, detents, bore, and band exiting the rectangular opening and formed with holes received by the peg, according to one embodiment of the disclosure.

In the preferred embodiment, the Lateral Canthotomy and Cantholysis Simulation Device 100 also includes a first band 144 (shown in FIG. 6) having a first end attached to an anchor 106, which in the preferred embodiment is formed to resemble simulated debris, and a second end formed with holes 145 (shown in FIG. 8). It is contemplated that the anchor 106 may be formed to resemble various other objects such as skin, hair, and wounds. The first band 144 in simulates the canthal tendon.

Figure 3:
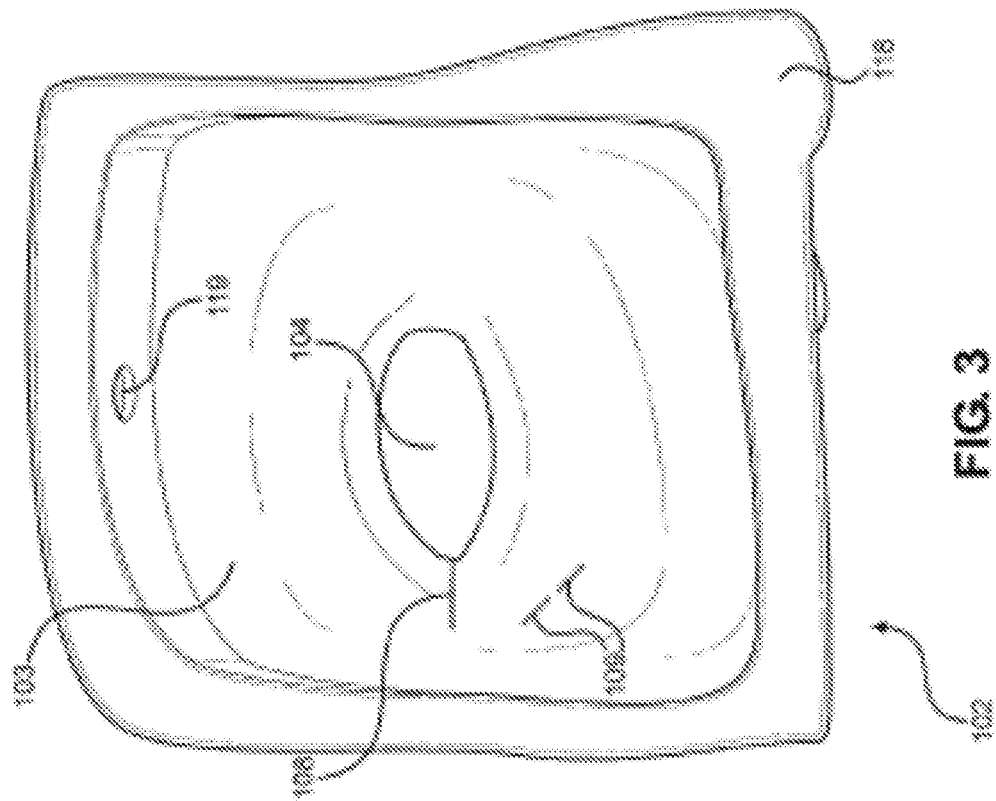
FIG. 3 is a back view of the simulated skin covering of the lateral canthotomy and cantholysis simulation device, showing the partial nose, eye opening, indent, preformed incision and two openings, according to one embodiment of the disclosure.
Figure 2:
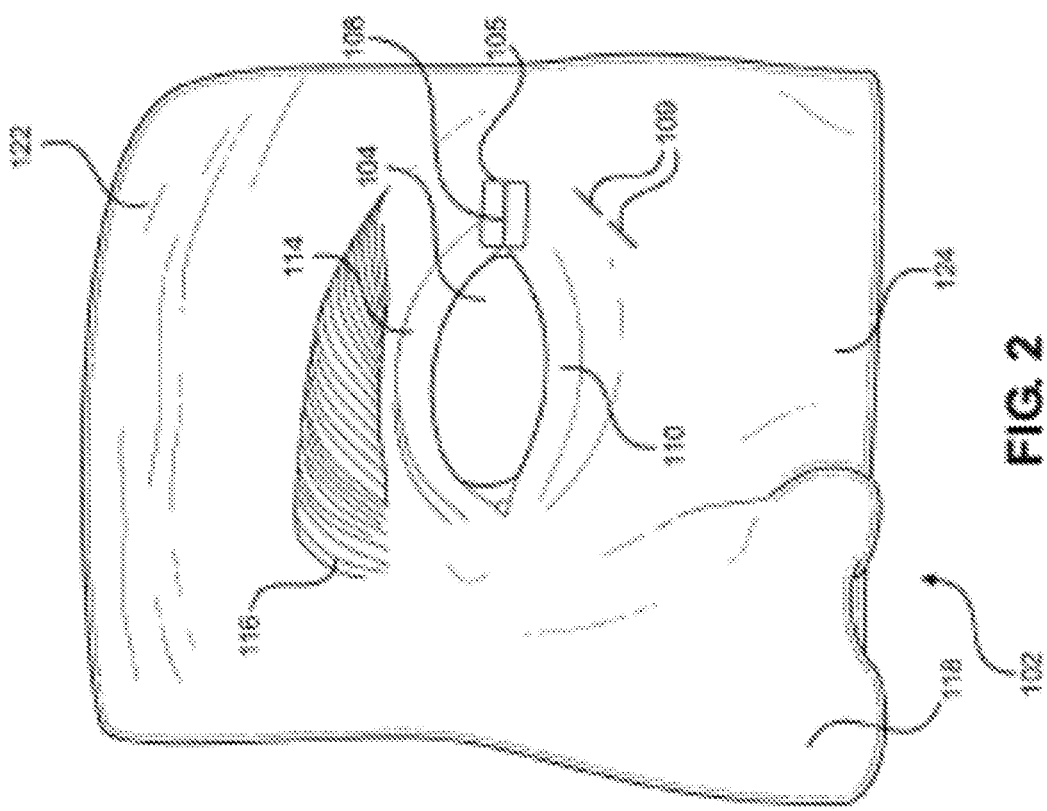
FIG. 2 is a front view of the simulated skin covering of the lateral canthotomy and cantholysis simulation device, showing an eye opening, simulated skin covering, upper and lower eyelids, brow, partial nose, partial forehead, partial cheek, preformed incision with an adhesive covering, and two (2) openings, according to one embodiment of the disclosure.

FIGS. 2 and 3 show the skin covering 102 of the Lateral Canthotomy and Cantholysis Simulation Device 100 of the present disclosure.

As stated above and shown in FIG. 2, the skin covering 102 includes a preformed incision 108 at the lateral corner of the simulated eye 112 where the upper lid 114 and lower lid 110 of the skin covering 102 meet. The preformed incision 108 is used to simulate the incision made at the lateral corner of a patient's eye during a lateral canthotomy. In addition to the preformed incision 108, the skin covering 102 of the Lateral Canthotomy and Cantholysis Simulation Device 100 of the current disclosure is formed with two (2) openings 109. The openings 109 correspond to a rectangular opening 134 on base 120 and a circular opening 132 on base 120, which will be subsequently discussed in FIGS. 4-9.

FIG. 3 is a back view of the skin covering 102 showing the perspective view of the interior 103 of skin covering 102. Skin covering 102 is shown with openings 109, preformed incision 108, and eye opening 104. The interior sides of skin covering 102 are formed with three (3) indents 119 that correspond to three (3) detents 123 on base 120 (shown in FIGS. 4 and 5). The indents 119 and detents 123 temporarily secure skin covering 102 to base 120 as described below.

Figure 4:
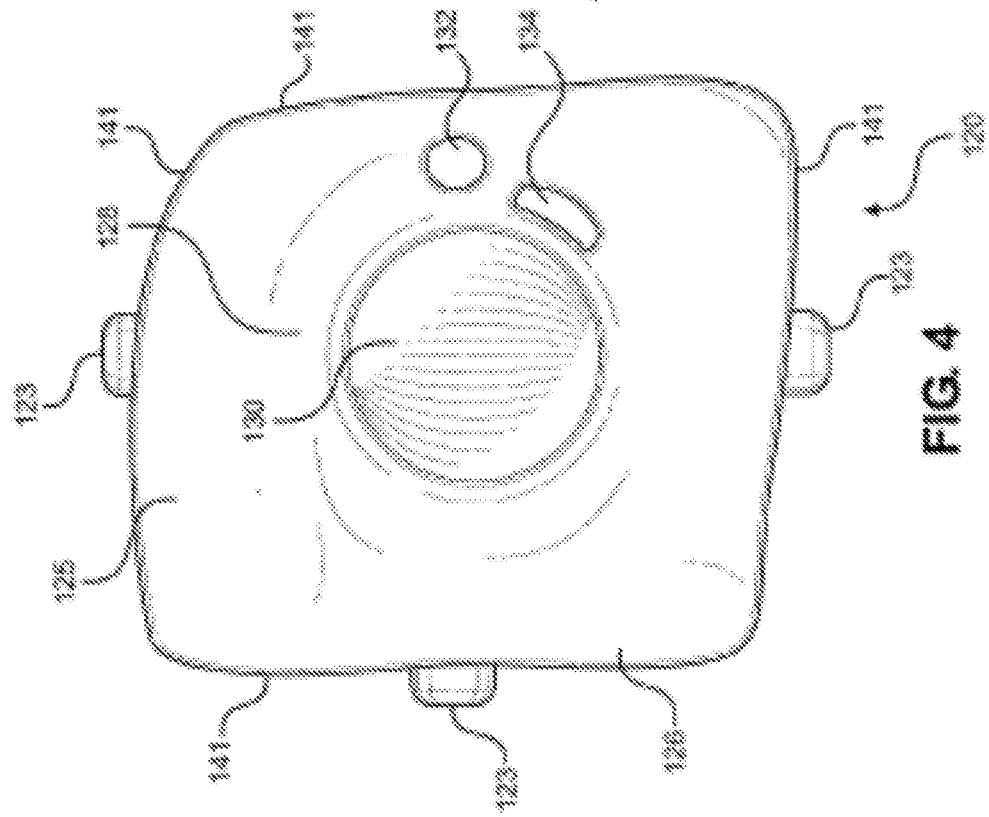
FIG. 4 is a front view of the base of the lateral canthotomy and cantholysis simulation device, showing a depression for receiving a simulated eye, rectangular opening, circular opening, brow bridge, nose bridge, and detents, according to one embodiment of the disclosure.

Referring now to FIG. 4, the base 120 of the Lateral Canthotomy and Cantholysis Simulation Device 100 of the current disclosure is shown. The base 120 is substantially square in shape and can be made of various materials including, but not limited to, plastic, wood, silicone, etc. Base 120 has a front side 125 and a back side 140 (shown in FIG. 5). In a preferred embodiment of the Lateral Canthotomy and Cantholysis Simulation Device 100 of the present disclosure, base 120 also consists of four peripheral sides 141. While FIG. 4 depicts base 120 as substantially square, base 120 can be any shape or size.

On the front side 125 of base 120 is a depression 130 formed to receive the simulated eye 112 (as shown in FIG. 1) much in the same way the orbit of the skull receives a human eye. The front side 125 of base 120 is also formed with a brow ridge 128 and partial nose ridge 126 similar to that of a human skull to provide structure to the skin covering 102 that covers the base 120. The base 120 may be formed with other structures depending on the size of base 120 and may be designed to mimic the human skull to give the Lateral Canthotomy and Cantholysis Simulation Device 100 of the present disclosure a more realistic appearance.

The base 120 is also formed with two openings, one (1) rectangular 134 and one (1) circular 132. The rectangular opening 134 and circular opening 132 are located to the bottom right of the depression 130 on front side 125 of the base 120. While FIG. 4 depicts the base 120 as having two openings, multiple opening may be used or one (1) opening may be used.

Three detents 123 are located on the peripheral sides 141 of base 120. As stated above, the detents 123 are received by corresponding indents 119 located on the inside surface of the skin covering 102 and used to secure the skin covering 102 to base 120.

Figure 5:
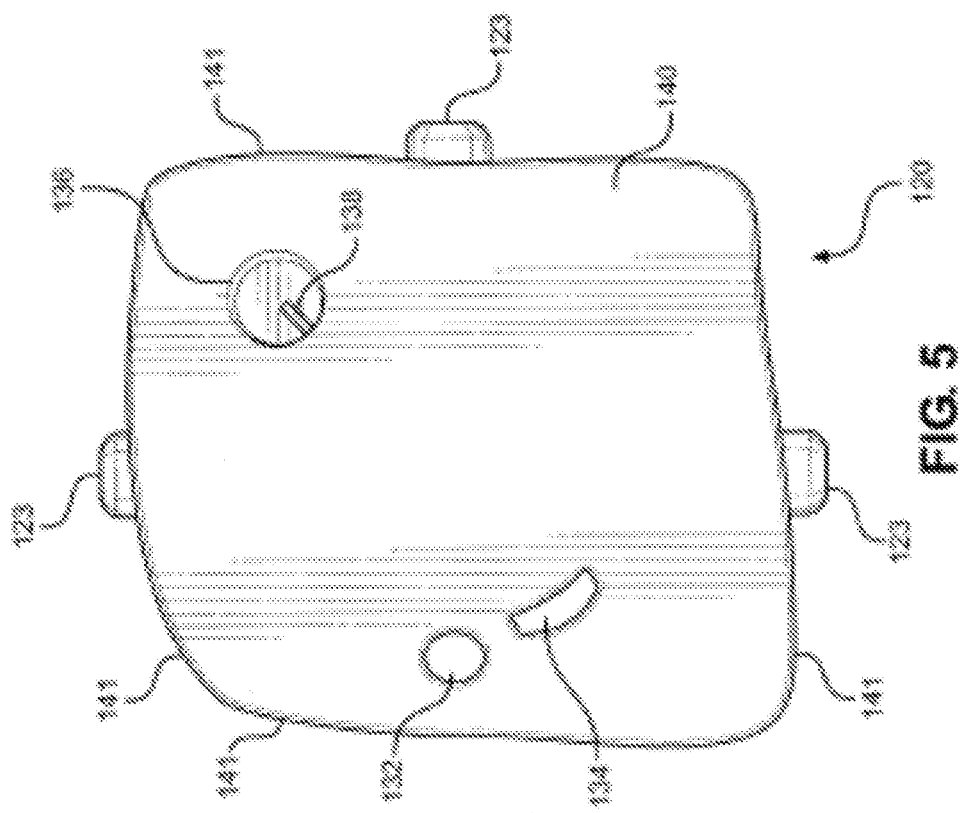
FIG. 5 is a back view of the base of the lateral canthotomy and cantholysis simulation device, showing the rectangular opening, circular opening, bore, peg, and detents, according to one embodiment of the disclosure.

FIG. 5 shows the back side 140 of base 120. The rectangular opening 134 and circular opening 132 are visible. The back side 140 of base 120 also has a bore 136 and peg 138 located in the upper right corner. The peg 138 extends from the side of bore 136. The bore 136 and peg 138 provides a mounting point for the holes 145 of the band 144 on the backside 140 of the base 120. The location of bore 136 and peg 138 is not meant to be limiting and it is contemplated that the location of bore 136 and peg 138 may be located in various locations on the back 140 of the base 120 while still providing a mounting point for the band 144.

Referring now to FIG. 6-11, an assembled Lateral Canthotomy and Cantholysis Simulation Device 100 is shown without skin covering 102 for clarity purposes.

Looking first at FIG. 6, the front 125 of base 120 is shown with a simulated eye 112 attached to depression 130. Any mechanisms known in the art may be used for the attachment of eye 112 to depression 130 including, but not limited to, Velcro®, adhesive, welding, etc. In addition, as shown in FIG. 1, the skin covering 102 partially covers the simulated eye 112 and thus, the simulated eye 112 need not be attached to depression 130. Rather, simulated eye 112 can be placed in depression 130 and skin covering 102 acts as a means to hold simulated eye 112 to base 120.

The first band 144 is used to simulate the canthal tendon. The first band 144 may be made of any material known to those skilled in the art, including, but not limited to, rubber, plastic, neoprene, latex, etc. In a preferred embodiment, the first band is made of a flexible material capable of providing a tension to simulate the tension of the canthal tendon.

The first band 144 is attached at one end to the anchor, or simulated debris 106. The simulated debris 106 should be of an appropriate size and shape in order to prevent the first band 144 from being pulled completely through the opening 109 of the skin covering 102 (shown in FIG. 2) and the rectangular opening 132 of base 120. First band 144 is formed with several holes 145. Multiple holes 145 may be formed into first band 144 or only one (1) hole 145 may be formed.

As shown in FIG. 7, the end of first band 144 that is not attached to simulated debris 106 is threaded through rectangular opening 134 on the front side 125 of base 120. The simulated debris 106 acts as an anchor, not allowing the first band 144 to be pulled entirely through the rectangular opening 134. When using a preferred embodiment of the Lateral Canthotomy and Cantholysis Simulation Device 100 of the present disclosure, the simulated debris 106 is against the skin covering 102.

As shown in FIG. 8, first band 144 is threaded through the rectangular opening 134 on the front side 125 of base 120. First band 144 exits the rectangular opening 134 on the back side 140 of base 120. First band 144 is then stretched and then secured to peg 138 using holes 145 on first band 144. Although in a preferred embodiment of the Lateral Canthotomy and Cantholysis Simulation Device 100 of the present disclosure the first band 144 is secured via a peg 138 located in bore 136, any mechanism known in the art to secure first band 144 may be used.

Figure 9:
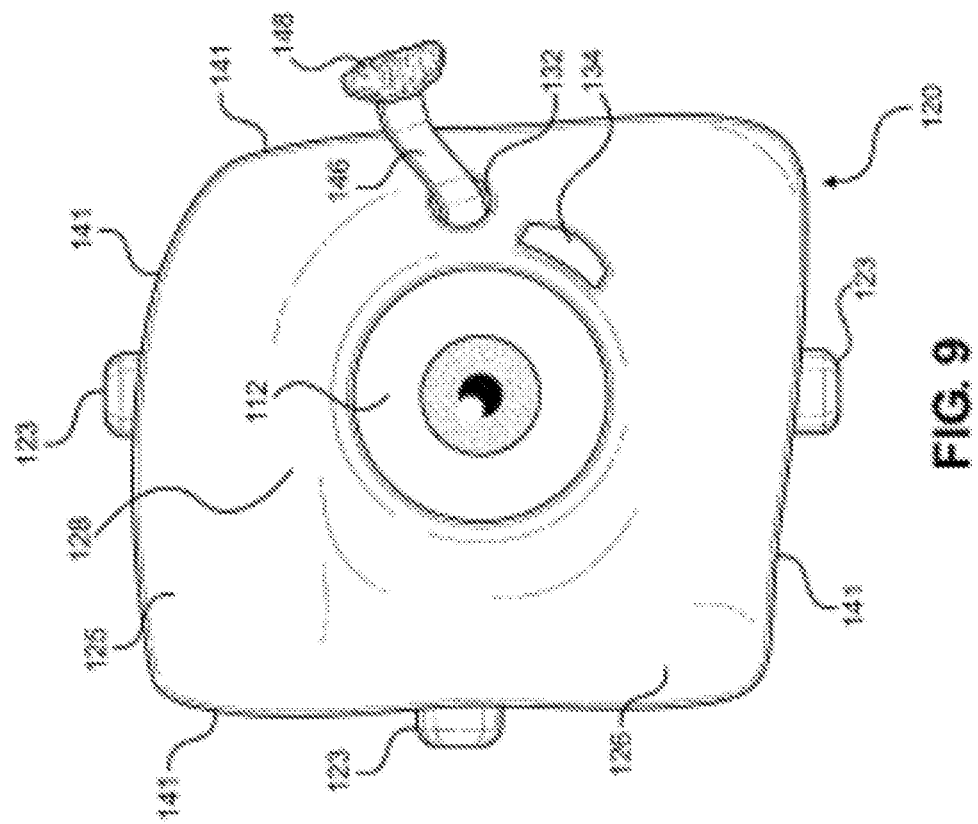
FIG. 9 is a front view of the base the lateral canthotomy and cantholysis simulation device, showing the brow bridge, nose bridge, simulated eye within the depression, circular opening, rectangular opening, second band inserted through the circular opening and attached to simulated debris, and detents, according to one embodiment of the disclosure.
Figure 11:
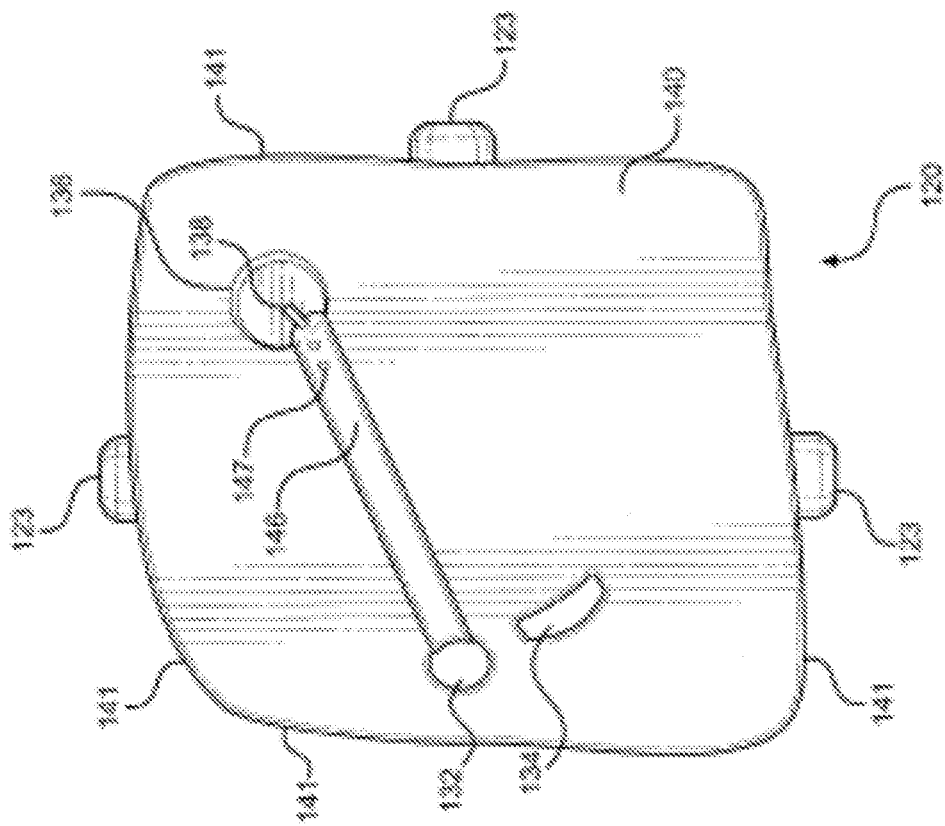
FIG. 11 is a back view of the base of the lateral canthotomy and cantholysis simulation device, showing the circular opening, rectangular opening, detents, bore, and second band exiting the circular opening and formed with holes received by the peg, according to one embodiment of the disclosure.
Figure 10:
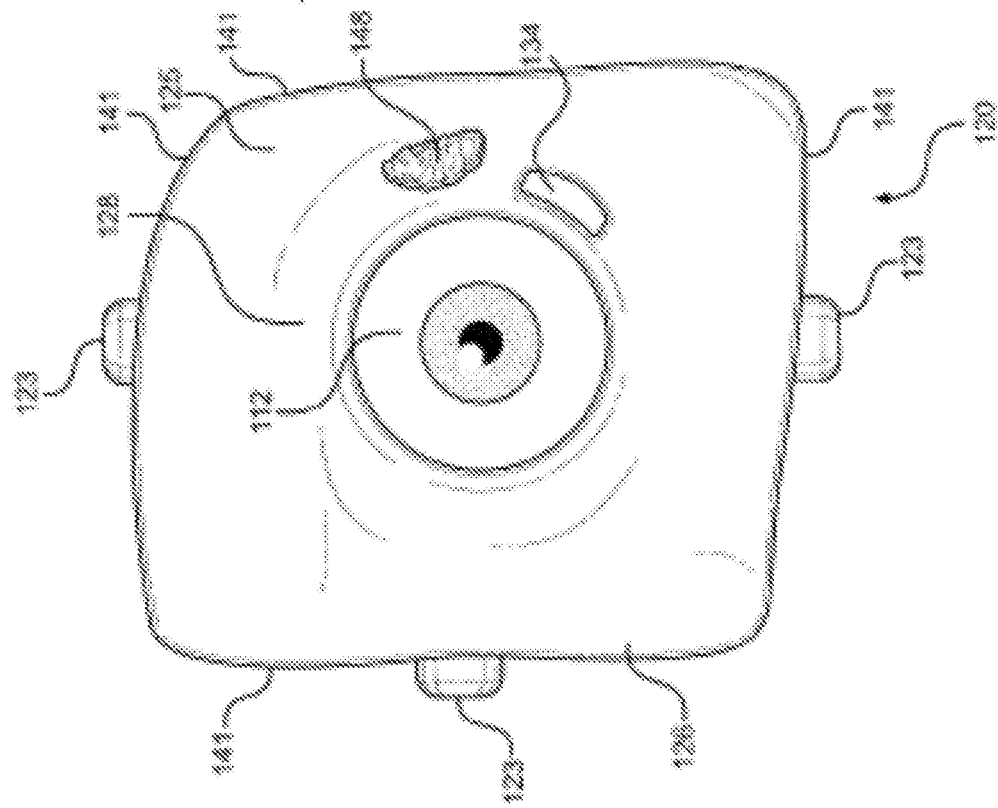
FIG. 10 is a front view of the base of the lateral canthotomy and cantholysis simulation device, showing the brow bridge, nose bridge, simulated eye within the depression, rectangular opening, simulated debris against the base, and detents, according to one embodiment of the disclosure.

FIGS. 9-11 describe a similar method of operating the Lateral Canthotomy and Cantholysis Simulation Device 100 of the present disclosure, in which a second band 146 is used to tether an alternative anchor, or simulated debris 148 closer to simulated eye 112. Again, the skin covering 102 is removed for clarity. Referring first to FIG. 9, the second band 146 is attached to simulated debris 148 at one end. Here, the simulated debris 148 is depicted as a piece of glass. While in FIG. 9 the simulated debris 148 is depicted as a piece of glass, any form of simulated debris 148 may be used. The simulated debris 148 is used to anchor the second band 146 and second band 146 acts to tether simulated debris 148 to the base 120 and skin covering 102. Thus, the simulated debris 148 should be of an appropriate size and shape in order to prevent the simulated debris 148 and second band 146 from being pulled completely through the opening 109 (shown in FIG. 2) of the skin covering 102 and the circular opening 132 of base 120. As stated above, circular opening 132 may be any shape or size, thus, second band 146 may be any corresponding size so long as the second band 146 can pass through opening 109 on skin covering 120 and circular opening 132 on base 102. The end of second band 146 that is not attached to simulated debris 148 is threaded through circular opening 132 on the front side 125 of base 120. The second band 146 acts to tether the simulated debris 148 to the front 125 of base 120, as shown in FIG. 10. When using a preferred embodiment of the Lateral Canthotomy and Cantholysis Simulation Device 100 of the present disclosure, the simulated debris 148 is tethered against the skin covering 102.

Referring now to FIG. 11, after threading second band 146 through circular opening 132, the second band 146 is stretched in order to create tension. Second band 146 is formed with several holes 147. Multiple holes 147 or only one (1) hole 147 may be formed into second band 146. After second band 146 is stretched to provide sufficient tension, second band 146 is secured to peg 138 using holes 147 on second band 146. As stated above, while in a preferred embodiment of the Lateral Canthotomy and Cantholysis Simulation Device 100 of the present disclosure the second band 146 is secured via a peg 138 located in bore 136, any mechanism known in the art to secure second band 146 may be used.

While base 120 is shown in FIGS. 2-9 as having two (2) openings, rectangular opening 134 and circular opening 132, any shape or size opening may be used. The purpose of both the rectangular opening 134 and circular opening 132 is to provide locations where the first band 144 or second band 146 may be cut to simulate cantholysis of the inferior tendon. Whether a rectangular opening 134, a circular opening 132, or either one alone are used, there should be a corresponding opening 109 in skin cover 102 (as shown in FIG. 2).

Figure 13:
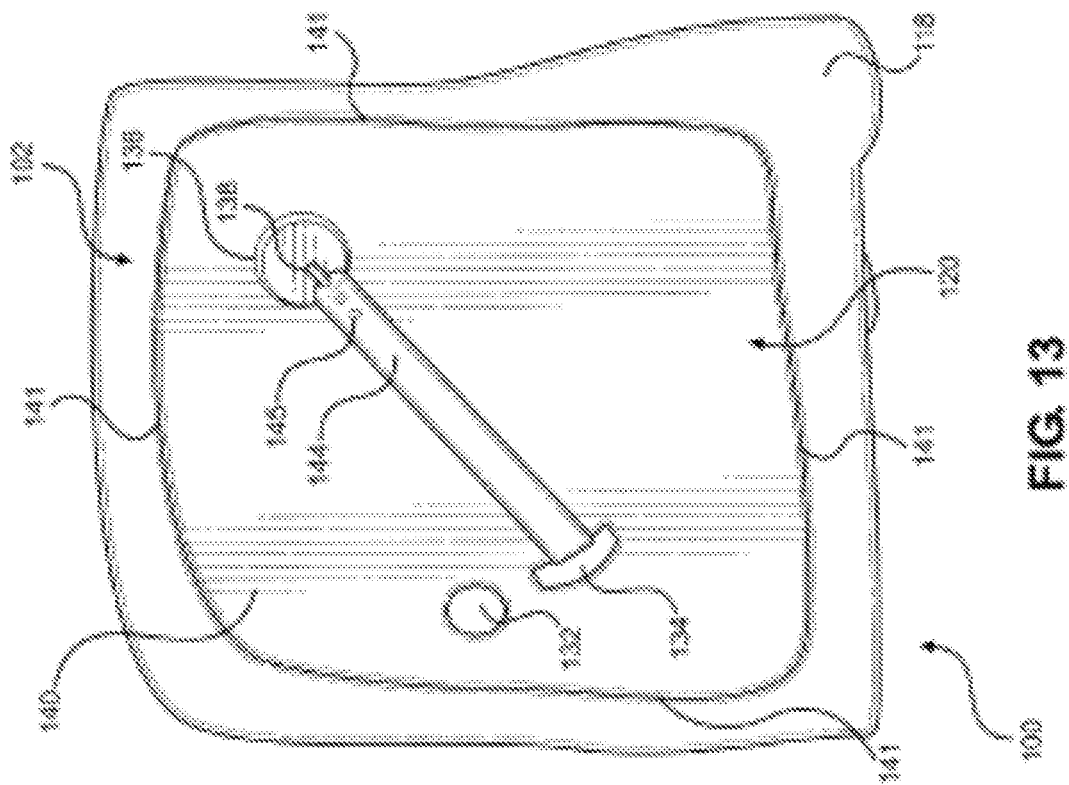
FIG. 13 is a back view of the lateral canthotomy and cantholysis simulation device, showing the skin covering, back of base, circular opening, rectangular opening, bore, and band exiting the rectangular opening and formed with holes received by a peg, according to one embodiment of the disclosure.
Figure 12:
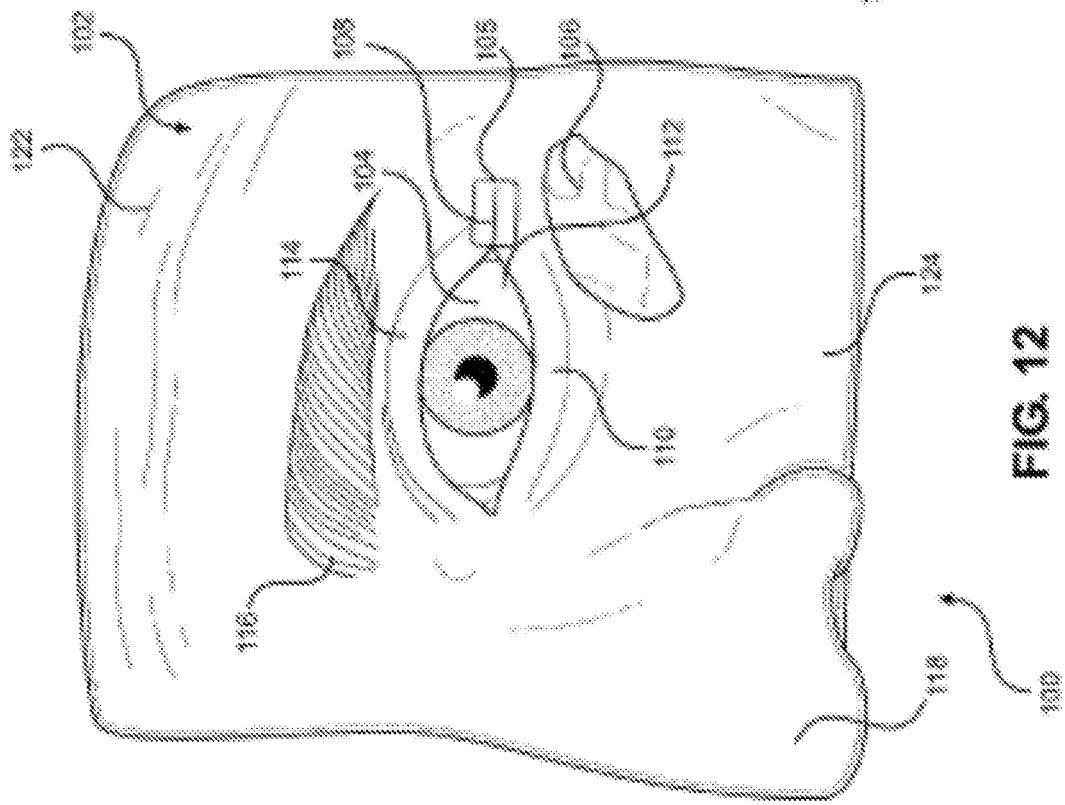
FIG. 12 is a front view of the lateral canthotomy and cantholysis simulation device, showing a simulated eye, skin covering, upper and lower eyelids, brow, partial nose, partial forehead, partial cheek, preformed incision with an adhesive covering, and simulated debris, according to one embodiment of the disclosure.

Referring to FIG. 12, in conjunction with FIG. 13, the Lateral Canthotomy and Cantholysis Simulation Device 100 of the present disclosure is shown. To use, simulated eye 112 is placed and attached to depression 130 formed into base 120, as discussed in FIG. 6. Simulated eye covering 102 is placed over base 120 and temporarily secured by the indents 119 (shown in FIG. 3) of skin covering 102 receiving the corresponding detents 123 (shown in FIG. 6) on base 120. In addition, an adhesive strip 105 is placed over the preformed incision 108.

To simulate the canthal tendon, first band 144 is threaded through opening 109 (shown in FIG. 2) on skin covering 102 and through the rectangular opening 134 on the front side 125 on base 120 as described in FIGS. 4 and 5. The first band 144 exits the rectangular opening 134 on the back side 140 of base 102, is pulled to create tension, and then secured on peg 138 using holes 145 formed into first band 144.

To perform the simulated lateral canthotomy and cantholysis, the user would first examine the simulated eye 112 and surrounding area of the skin covering 120 as one would examine a real patient. Next, the user could simulate the use of anesthetics by injecting numbing agents into the area surrounding the simulated eye 112. The user would then use hemostats, if available, along the preformed incision 108 and adhesive strip 105 to simulate clamping blood vessels awaiting ligation.

To perform the lateral canthotomy, the user uses tweezers (not shown) to slightly pull away the lower lid 110 of the skin covering 102 and cut the adhesive strip 105 along the preformed incision 108 using blunt tipped scissors, if available. This simulates the lateral canthotomy, which is performed by cutting horizontally from the lateral part of the eyelid to the bony margin of the orbital rim. This is approximately a 1 cm cut.

To simulate performing a cantholysis, the user would take the tweezers to pull the lower eyelid 110 away from the skin covering 102. Pulling the lower eyelid 110 away from base 120, would expose first band 144 in a tensioned state. The user then uses the same scissors to cut first band 144, simulating the cutting of the lateral canthal tendon. The same procedure would be used if the second band 146 were used with the circular opening 132.

After the simulated lateral canthotomy and cantholysis is performed, the adhesive strip 105 is removed and discarded. Because the first band 144 and adhesive strip 105 can be used, discarded, and replaced with a new first band 144 and adhesive strip 105, the Lateral Canthotomy and Cantholysis Simulation Device 100 of the present disclosure can be used repeatedly without requiring replacement of skin covering 102, base 120, or simulated eye 112.

Figure 14:
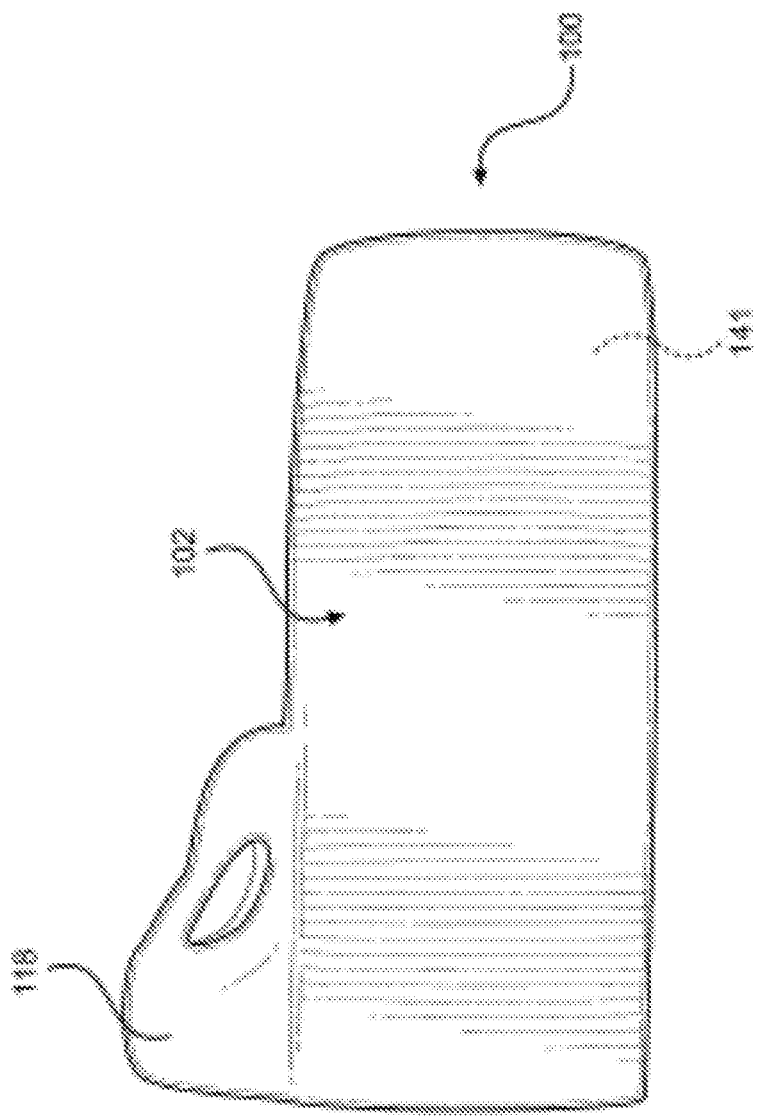
FIG. 14 is a bottom view of the lateral canthotomy and cantholysis simulation device, showing the peripheral sides of the skin covering and the bottom of the partial nose, according to one embodiment of the disclosure.

FIG. 14 shows the bottom of the lateral Canthotomy and Cantholysis Simulation Device 100 of the present disclosure. The skin covering 102 covers the peripheral sides 141 of base 120 (shown in FIG. 4). Although FIG. 14 depicts the skin covering 102 as covering the peripheral sides 141 of base 120, the skin covering 102 may not cover the peripheral sides 141 of base 120 if a different mechanism is used to secure skin covering 102 to base 120.

An alternative embodiment of the Lateral Canthotomy and Cantholysis Simulation Device of the present disclosure is shown in FIGS. 15-22 and generally designated 200. The alternative embodiment of the Lateral Canthotomy and Cantholysis Simulation Device 200 of the present disclosure does not use simulated debris 146 and 148, as described in previous embodiments.

Figure 16:
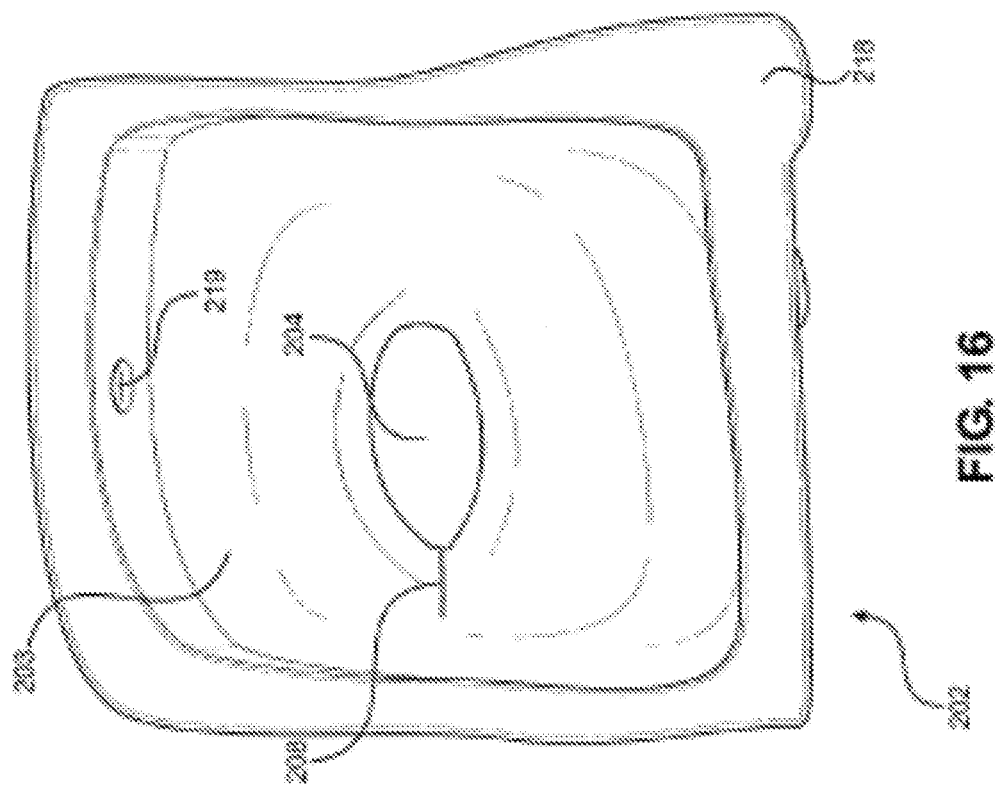
FIG. 16 is a back view of the simulated skin covering of an alternative embodiment of the lateral canthotomy and cantholysis simulation device, showing the partial nose, eye opening, indent, and preformed incision, according to one embodiment of the disclosure.
Figure 15:
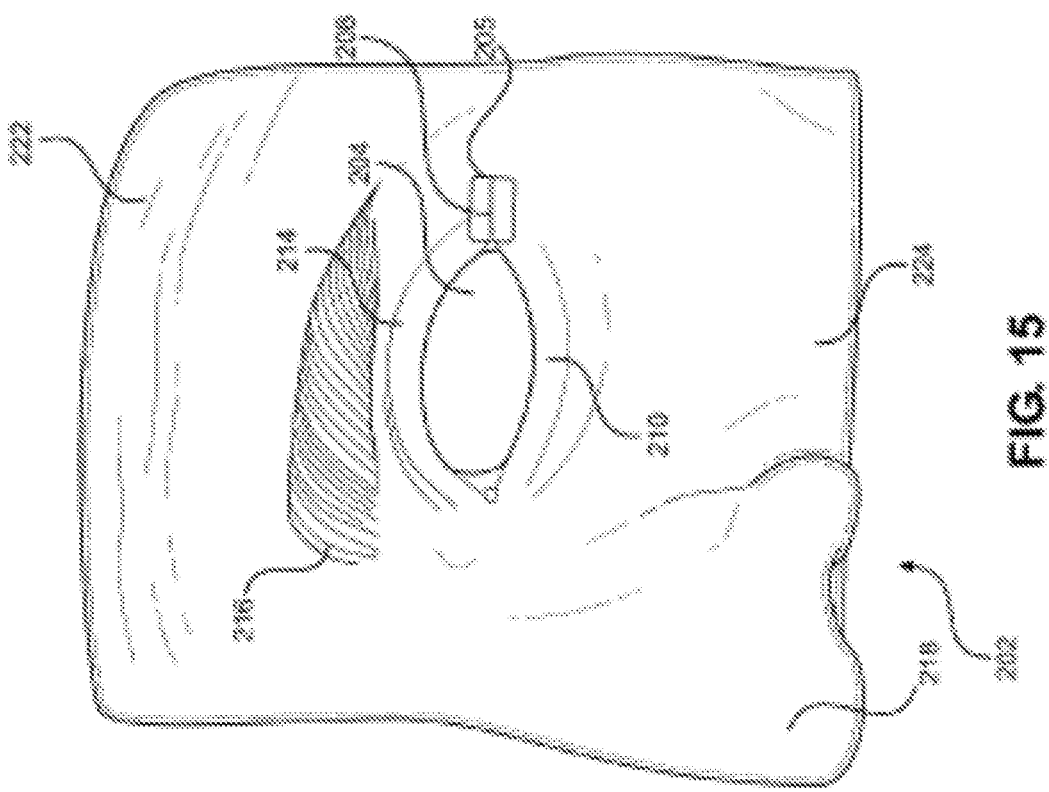
FIG. 15 is a front view of the simulated skin covering of an alternative embodiment of the lateral canthotomy and cantholysis simulation device, showing an eye opening, simulated skin covering, upper and lower eyelids, brow, partial nose, partial forehead, partial cheek, and preformed incision with an adhesive covering, according to one embodiment of the disclosure.

FIGS. 15 and 16 shows the skin covering 202 of the alternative embodiment of the Lateral Canthotomy and Cantholysis Simulation Device 200 of the present disclosure.

As shown in FIG. 15, the skin covering 202 depicts an upper right corner of a human face, including a partial forehead 222, brow 216, partial cheek 224, and partial nose 218.

The skin covering 202 includes a preformed incision 208 at the lateral corner of the simulated eye 212 where the upper lid 214 and lower lid 210 of the skin covering 202 meet. The preformed incision 208 is used to simulate the incision made at the lateral corner of a patient's eye during a lateral canthotomy.

FIG. 16 is a back view of the skin covering 202 showing a perspective view of the interior 203 of skin covering 202 with the preformed incision 208 and eye opening 204. The interior sides of skin covering 202 are formed with three (3) indents 219 that correspond to three (3) detents 223 on base 220 (shown, for example, in FIG. 17). The indents 219 and detents 223 temporarily secure skin covering 202 to base 220 as described below.

Figure 21:
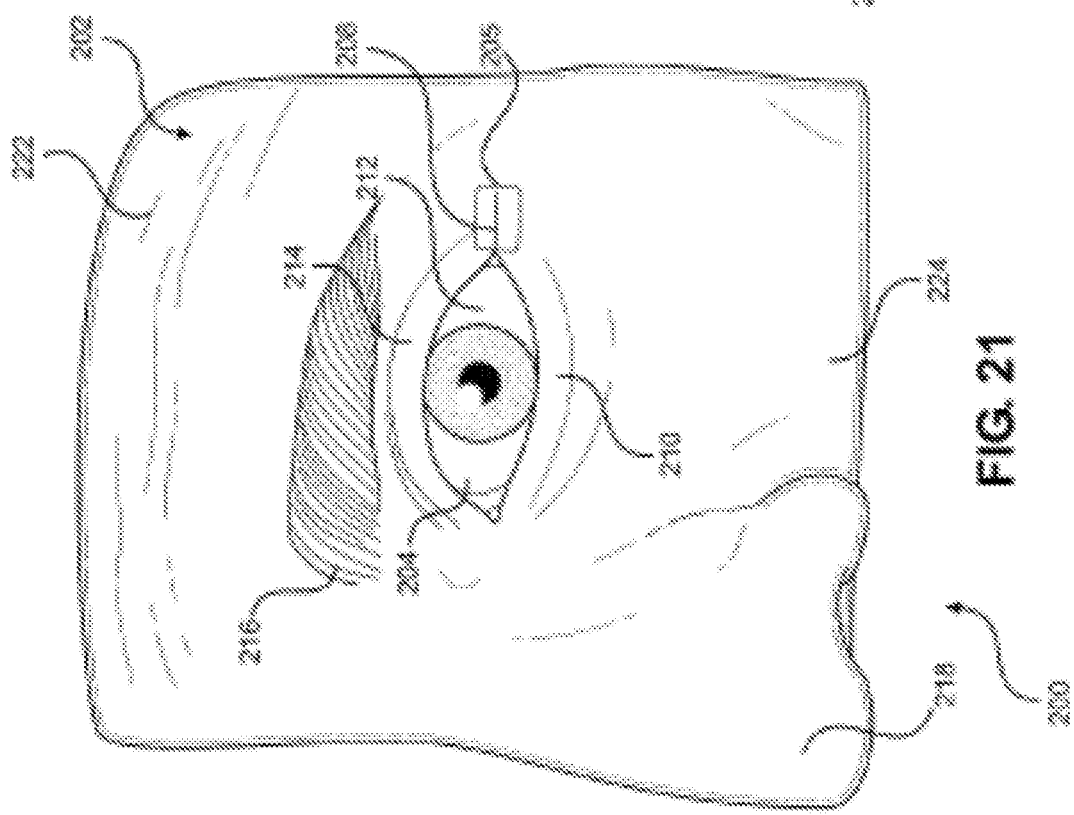
FIG. 21 is a front view of the assembled alternative embodiment of the lateral canthotomy and cantholysis simulation device, showing a simulated eye, the skin covering formed with a partial nose, brow, partial cheek, partial forehead, upper lid, lower lid, preformed incision, and adhesive strip, according to one embodiment of the disclosure.

Referring now to FIG. 17, the base 220 of the alternative embodiment of the Lateral Canthotomy and Cantholysis Simulation Device 200 of the current disclosure is shown. The base 220 is substantially square in shape and can be made of various materials including, but not limited to, plastic, wood, silicone, etc. While FIG. 17 depicts base 220 as substantially square, the base 220 can be any shape or size. Base 220 may be used to simulate a cantholysis without the use of skin covering 202. However, if base 220 is covered by skin covering 202 (as shown in FIG. 21), the shape and size of base 220 is dependent on skin covering 202.

Base 220 has a front side 225 and back side 240 (shown in FIG. 16). Base 220 also consists of four peripheral sides 241. While FIG. 17 depicts base 220 as substantially square, base 220 can be any shape or size. However, while base 220 may be used without skin covering 202, if base 220 is covered by skin covering 202, the shape and size of base 220 is dependent on skin covering 202. In addition, base 220 may be any color, or may be designed to visually mimic the tissue under the skin.

Figure 19:
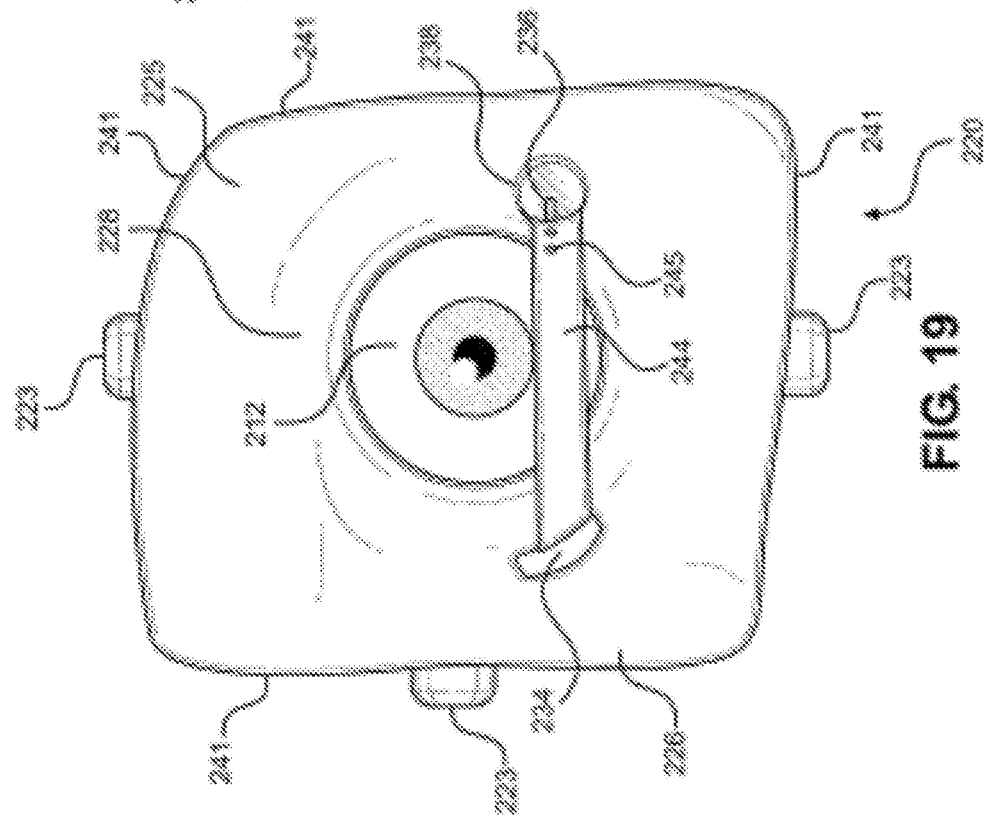
FIG. 19 is a front view of the base of the alternative embodiment of the lateral canthotomy and cantholysis simulation device, showing a brow ridge, nose ridge, simulated eye, rectangular opening, detents, front bore, and a band inserted through the rectangular opening and formed with holes received by a front peg, according to one embodiment of the disclosure.

On the front side 225 of base 220 is a depression 230 formed to receive the simulated eye 212 (as shown in FIG. 19). The front 225 of base 220 is also formed with a brow ridge 228 and partial nose ridge 226 similar to that of a human skull, to provide structure to the skin covering 202 that covers the base 220 and to give a more realistic appearance.

The base 220 is also formed with one (1) rectangular opening 234 located on the bottom left of the depression 230 on the front 225 of the base 220. While FIG. 17 depicts the base 220 as having a rectangular opening 234, the opening may be any shape or size. Also on the front 225 of base 220 is a front bore 238 and front peg 236 located on the bottom right corner of depression 230. The peg 236 is located on the inside rim of bore 238. Referring briefly to FIG. 19, the rectangular opening 234 and front bore 238 should be located on the base 220 so that the band 244 is suspended between rectangular opening 234 and front bore 238, where the band 244 partially lays on the simulated eye 212. The band 244 should be positioned so that it is completely covered by lower lid 210, although this is not required for use.

Referring back to FIG. 17, three (3) detents 223 are located on the peripheral sides 241 of base 220. The detents 223 are received by corresponding indents 219 located on the inside peripheral surface of the skin covering 202 (shown in FIG. 16) and used to secure the skin covering 202 to base 220. Although the mechanism used to temporarily secure skin covering 202 to base 220 are detents 223 and indents 219, any mechanism that is known in the art to temporarily secure skin covering 202 to base 220 may be used.

FIG. 18 shows the back side 240 of base 220. The rectangular opening 234 is visible. The back 240 of base 220 has a rear bore 237 and a rear peg 239 located in the upper left corner of base 220. The rear bore 237 and rear peg 239 provides a mounting point for the holes 245 of the band 244 on the backside. The location of the rear bore 237 and rear peg 239 is not meant to be limiting and it is contemplated that the location of the rear bore 237 and rear peg 239 may be located in various locations on the back 240 of the base 220 while still providing a mounting point for the band 244.

Referring again to FIG. 19, the front 225 of base 220 is shown with a simulated eye 212 attached to the depression 230. A variety of different mechanisms known in the art may be used to attach simulated eye 212 to depression 230 including, but not limited to Velcro, adhesives, welding, etc. In addition, because the skin covering 202 partially covers the simulated eye 212 the simulated eye 212 need not be attached to depression 230. Rather, simulated eye 212 can be placed in depression 230 and skin covering 202 acts as a means to hold simulated eye 212 to base 220.

Figure 20:
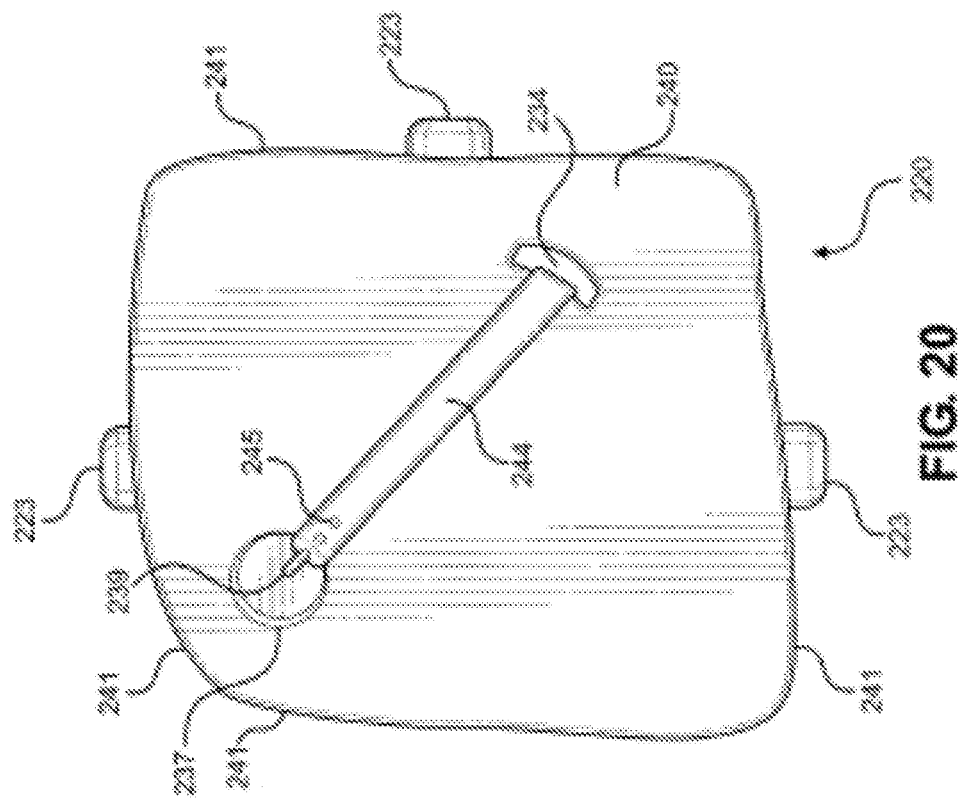
FIG. 20 is a back view of the base of the alternative embodiment of the lateral canthotomy and cantholysis simulation device, showing a rectangular opening, detents, and band exiting the rectangular opening and formed with holes received by a rear peg, according to one embodiment of the disclosure.

As shown in FIG. 19 and FIG. 20, band 244 is formed with holes 245 located on each end of the band 244. Multiple holes 245 may exist on each end of band 244 or only one (1) hole 245 may be formed into each end of band 244. One end of band 244 is secured on the front peg 236 using the holes 245. The opposite end of the band 244 is threaded through the rectangular opening 234 through the front side 225 of base 220. The band 244 lay across the simulated eye 212 in order to simulate the inferior crus of the lateral canthal tendon.

shown in FIG. 20, the band 244 exits through rectangular opening 234 out the back side 240 of base 220 and is secured by rear peg 239 using holes 245. Although a preferred embodiment of the Lateral Canthotomy and Cantholysis Simulation Device 200 of the present disclosure uses a rear peg 239 and rear bore 237 to secure band 244, any mechanism known in the art may be used without deviating from the spirit and scope of the disclosure.

Figure 22:
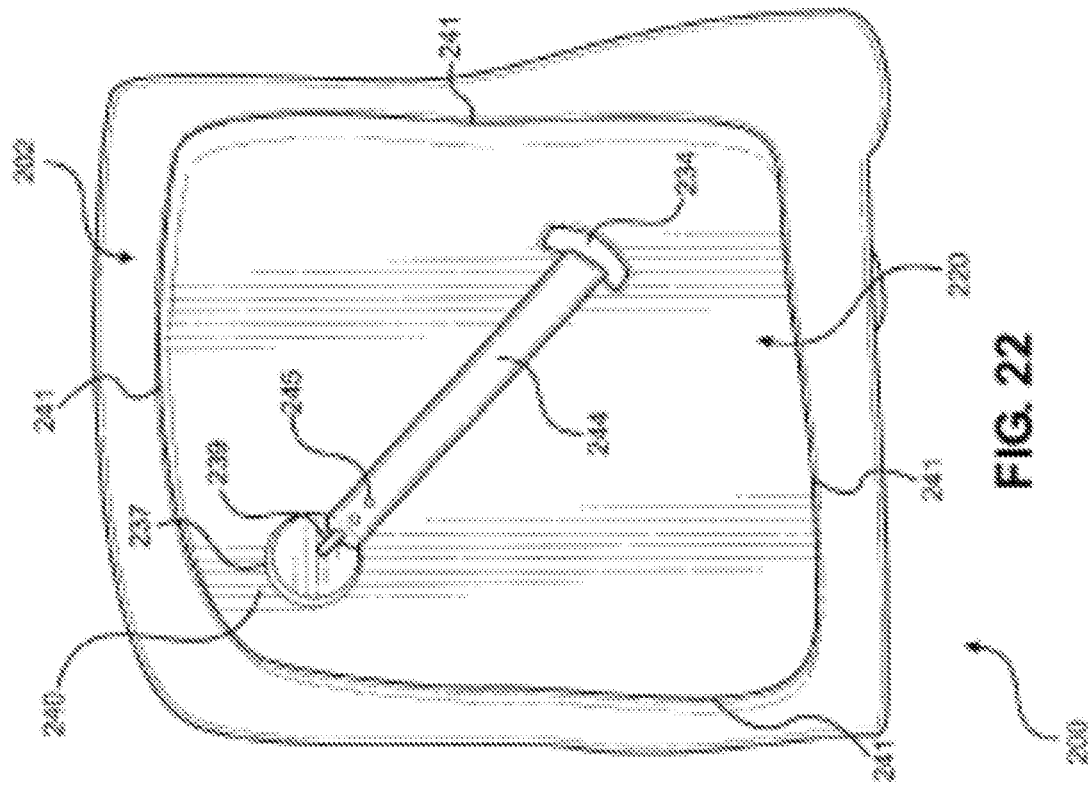
FIG. 22 is a back view of the assembled alternative embodiment of the lateral canthotomy and cantholysis simulation device, showing the skin covering, rectangular opening, bore, and band exiting the rectangular opening and formed with holes received by rear peg, according to one embodiment of the disclosure.

In FIG. 21, the alternative embodiment of the Lateral Canthotomy and Cantholysis Simulation Device 200 of the present disclosure is shown. After band 244 has been secured as described above, skin covering 202 is placed over base 220 and temporarily secured by the indents 219 of the skin covering 202 receiving the corresponding detents 223 on base 220. In addition, an adhesive strip 205 is placed over the preformed incision 208. FIG. 22 shows the back of the assembled alternative embodiment of the Lateral Canthotomy and Cantholysis Simulation Device 200 of the present disclosure. Skin covering 202 covers the peripheral sides 241 of base 220, but does not cover the back side 240 of base 220.

Figure 23:
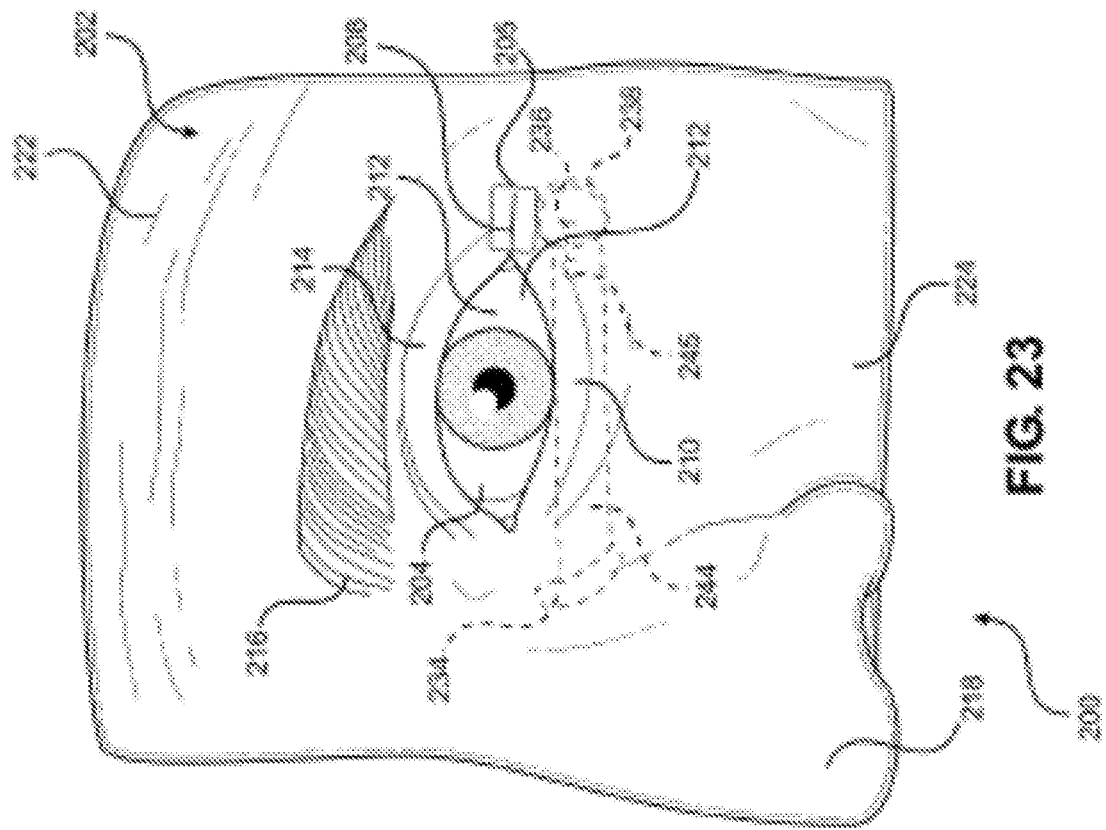
FIG. 23 is a front view of the assembled alternative embodiment of the lateral canthotomy and cantholysis simulation device, showing the rectangular opening, front bore, and band formed with notches received by front peg in dashed lines, according to one embodiment of the disclosure.

FIG. 23 shows an assembled alternative embodiment of the Lateral Canthotomy and Cantholysis simulation device of the present disclosure with the rectangular opening 234, band 244, holes 245, front bore 238, and front peg 236 located under the skin covering 202 and depicted in dashed lines to show their position underneath the skin covering 202.

To perform the simulated lateral canthotomy and cantholysis using the alternative embodiment of the Lateral Canthotomy and Cantholysis Simulation Device 200 of the present disclosure, the user would first examine the simulated eye 212 and surrounding area of the skin covering 202 as one would examine a real patient. Next, the user could use a numbing agent to simulate the numbing of the area surrounding the simulated eye 212. The user would then use hemostats, if available, along the preformed incision 108 and adhesive strip 205 to simulate clamping blood vessels awaiting ligation.

To perform the lateral canthotomy, the user uses tweezers (not shown) to slightly pull away the lower lid 210 of the skin covering 202 from simulated eye 212 and cut the adhesive strip 205 along the premade incision 208 using blunt tipped scissors, if available. This simulates the lateral canthotomy, which is performed by cutting horizontally from the lateral part of the eyelid to the bony margin of the orbital rim. The incision is approximately 1 cm in length.

Figure 24:
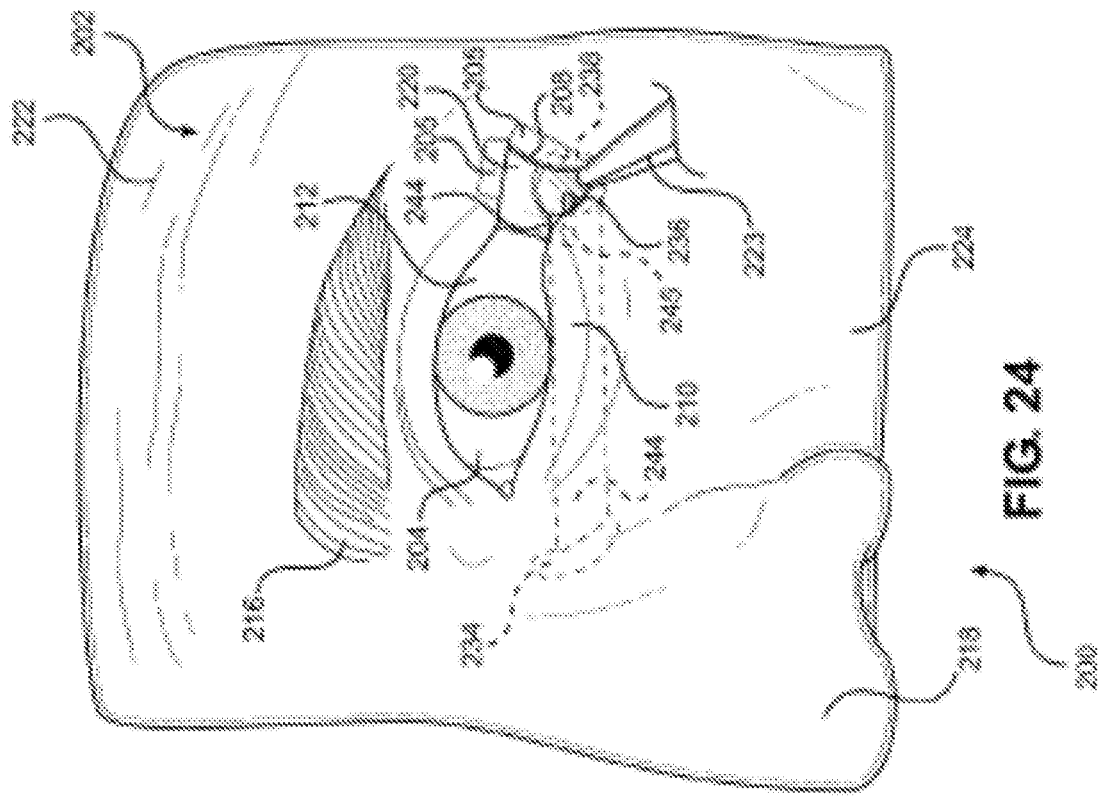
FIG. 24 is a front view of the assembled alternative embodiment of the lateral canthotomy and cantholysis simulation device, showing the alternative embodiment of the lateral canthotomy and cantholysis simulation device after simulated lateral canthotomy, but prior to simulated cantholysis, with the adhesive strip cut and the preformed incision peeled back from the base using tweezers, according to one embodiment of the disclosure.

To simulate performing a cantholysis, as depicted in FIG. 24, the user would take the tweezers 223 and gently peel back the lower lid 210 of the skin covering 202 at the preformed incision 208, exposing the band 244 underneath skin covering 202. The other hand of the user (not shown) would use scissors (not shown), to cut the exposed band 244. Cutting the band 244 simulates the cutting of the lateral canthal tendon.

After the simulated lateral canthotomy and cantholysis is performed, the adhesive strip 208 and band 244 are removed and discarded. Because the band 244 and adhesive strip 208 can be used, discarded, and replaced with a new band 244 and adhesive strip 208, the alternative embodiment of the Lateral Canthotomy and Cantholysis Simulation Device 200 of the present disclosure can be used repeatedly without requiring replacement of skin covering 202.

Figure 26:
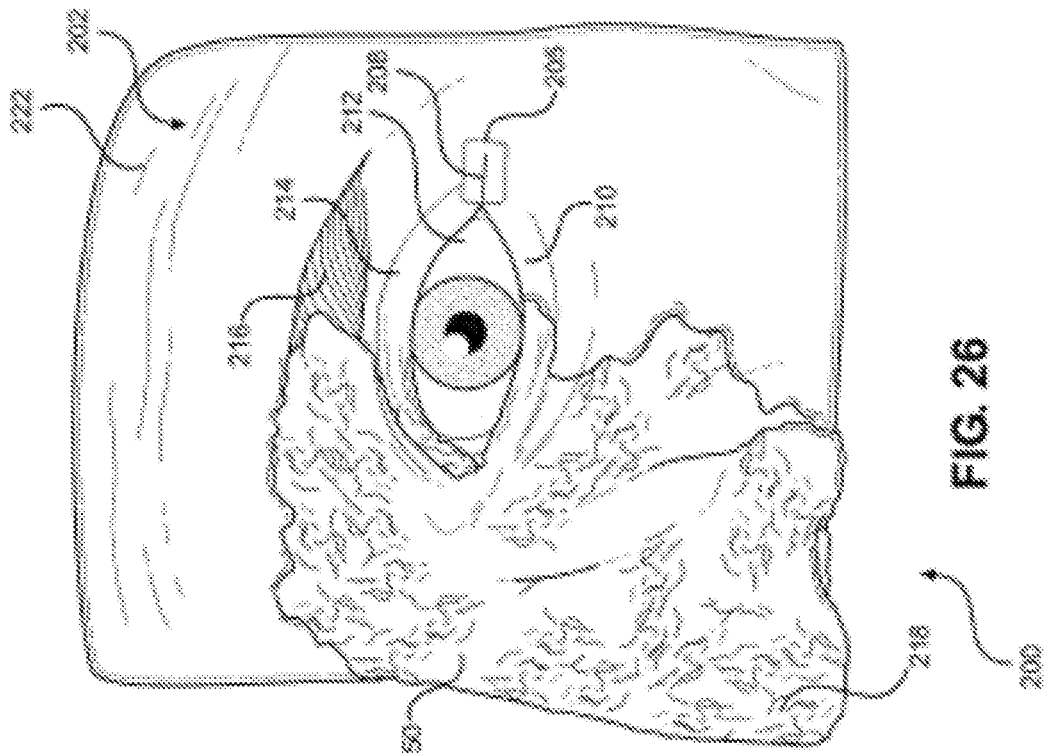
FIG. 26 is a front view of the assembled alternative embodiment of the lateral canthotomy and cantholysis simulation device, showing the skin covering formed with simulated burns, according to one embodiment of the disclosure.
Figure 25:
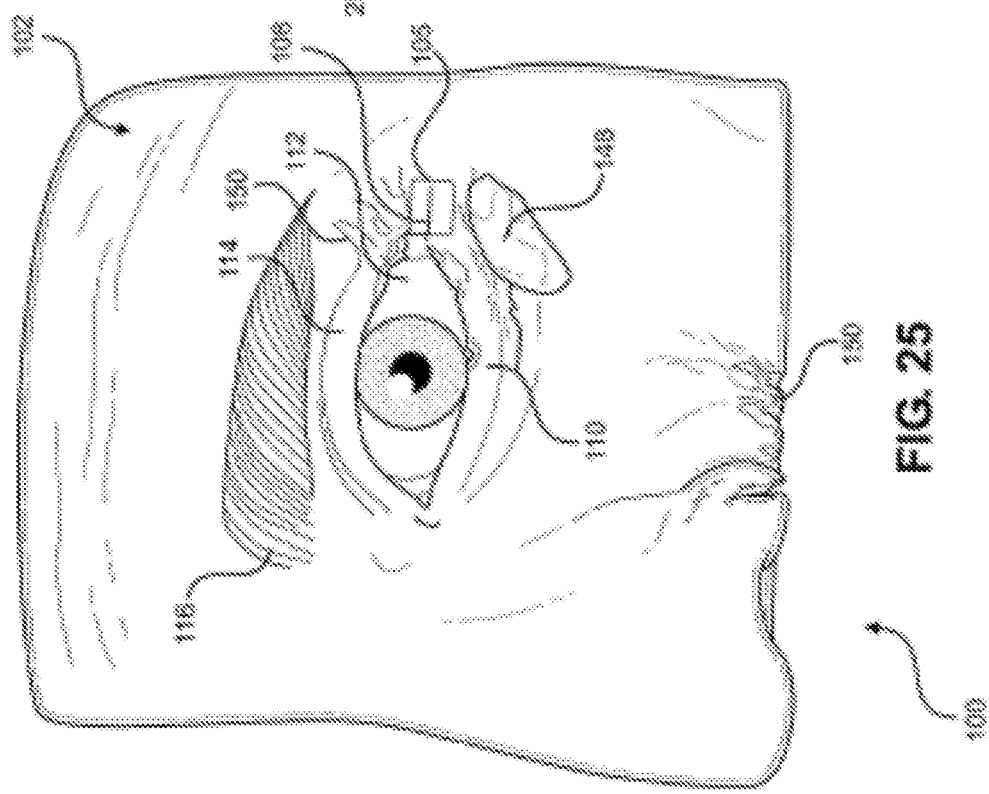
FIG. 25 is a front view of the assembled preferred embodiment of the lateral canthotomy and cantholysis simulation device, showing the skin covering formed with multiple simulated injuries, according to one embodiment of the disclosure.

FIGS. 25 and 26 show possible variations of a preferred embodiment of the Lateral Canthotomy and Cantholysis Simulation Device 100 of the present disclosure and the alternative embodiment of the Lateral Canthotomy and Cantholysis Simulation Device 200 of the present disclosure, respectively. In FIG. 25, the Lateral Canthotomy and Cantholysis Simulation Device 100 of the present disclosure shows the skin covering 102 with simulated injuries 150 and simulated debris 148. In FIG. 26, the alternative embodiment of the Lateral Canthotomy and Cantholysis Simulation Device 200 is shown with an area simulating a burn 250.

Figure 27:
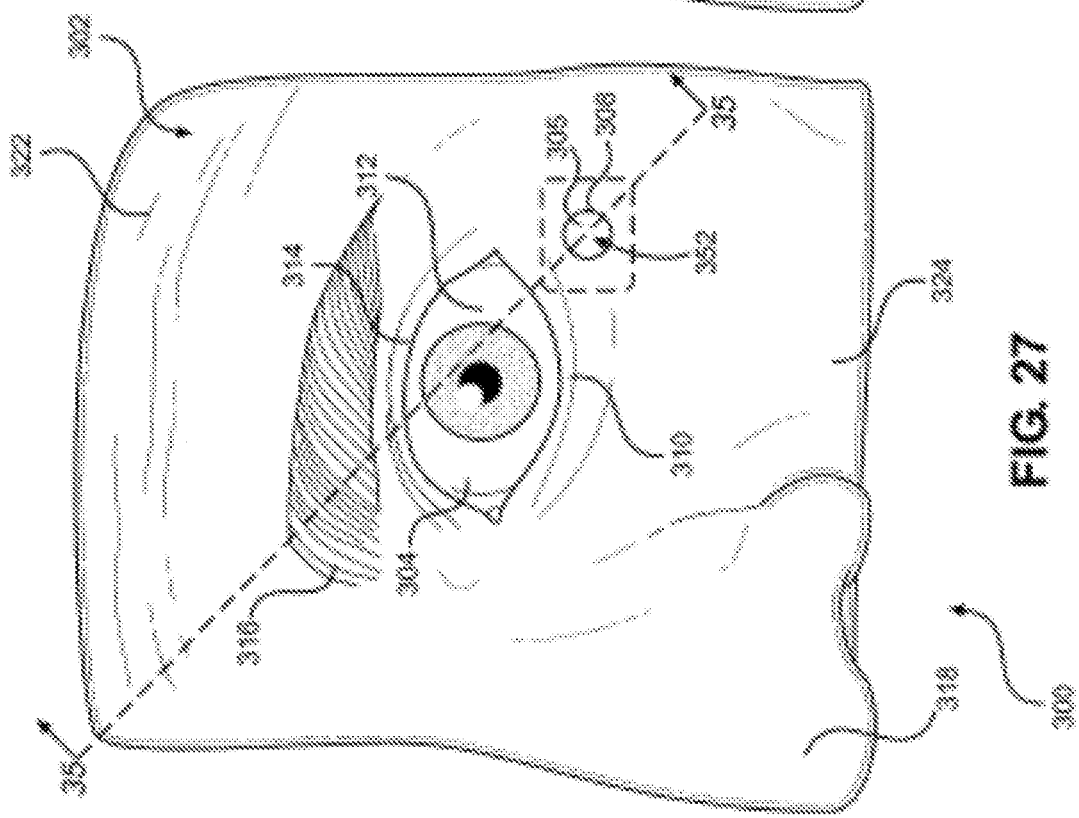
FIG. 27 a front view of the assembled alternative embodiment of the lateral canthotomy and cantholysis simulation device, showing the skin covering with flushed skin plug, according to one embodiment of the disclosure.
Figure 35:
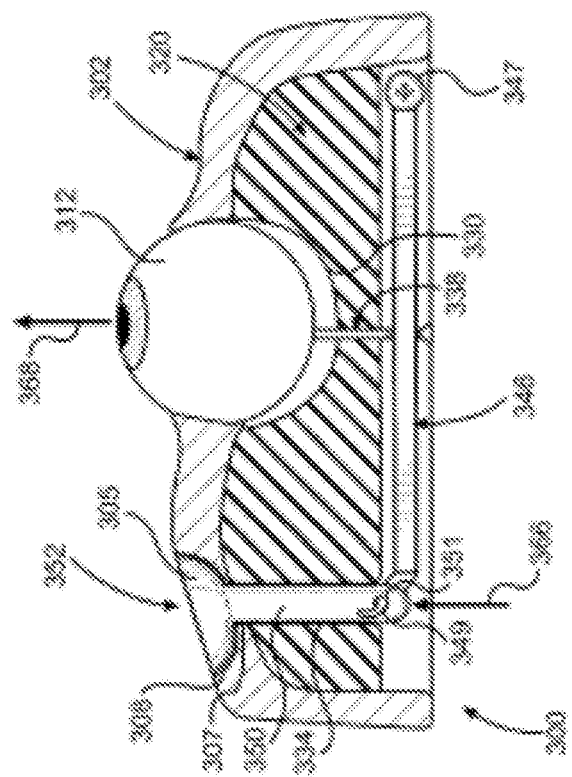
FIG. 35 is a cross-sectional view of FIG. 27 taken along line 35-35, showing the alternative embodiment of the lateral canthotomy and cantholysis simulation device in the tensioned configuration, with the hook of the bending member received by the hook receivers formed in the plug band, pushing the bending member and subsequently the simulated eye, forward, according to one embodiment of the disclosure.
Figure 37:
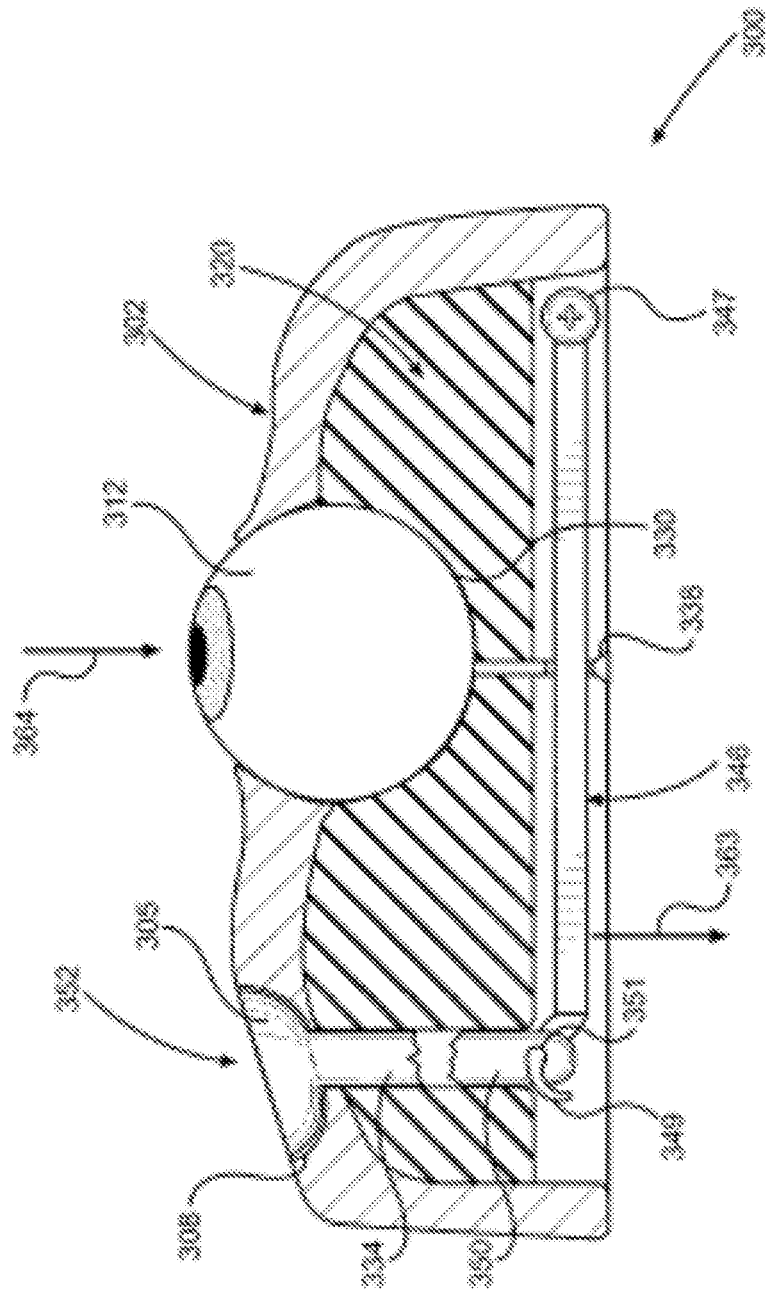
FIG. 37 is a depiction of FIG. 35 after the lateral canthotomy and cantholysis is performed, showing the plug band cut and the bending member and simulated eye returned to a relaxed configuration.

Referring next to FIG. 27, another alternative embodiment of the Lateral Canthotomy and Cantholysis Simulation Device of the present disclosure is shown and generally designated 300. In general, alternative embodiment of the Lateral Canthotomy and Cantholysis Simulation Device 300 may include a simulated eye 312 and an eye displacer or mechanism to simulate the lateral canthotomy and cantholysis. The mechanism may have a tensioned configuration and a relaxed configuration, where the tensioned configuration corresponds to an ocular injury and the relaxed configuration corresponds to or otherwise indicates a properly performed ocular surgery. For example, the tensioned configuration (as shown in FIG. 35) may hold the eye in a first position, and the relaxed configuration (as shown in FIG. 37) may displace the eye to a second position when the ocular surgery has been properly performed, here, when a simulated canthal tendon is cut (also as shown in FIG. 37).

Figure 28:
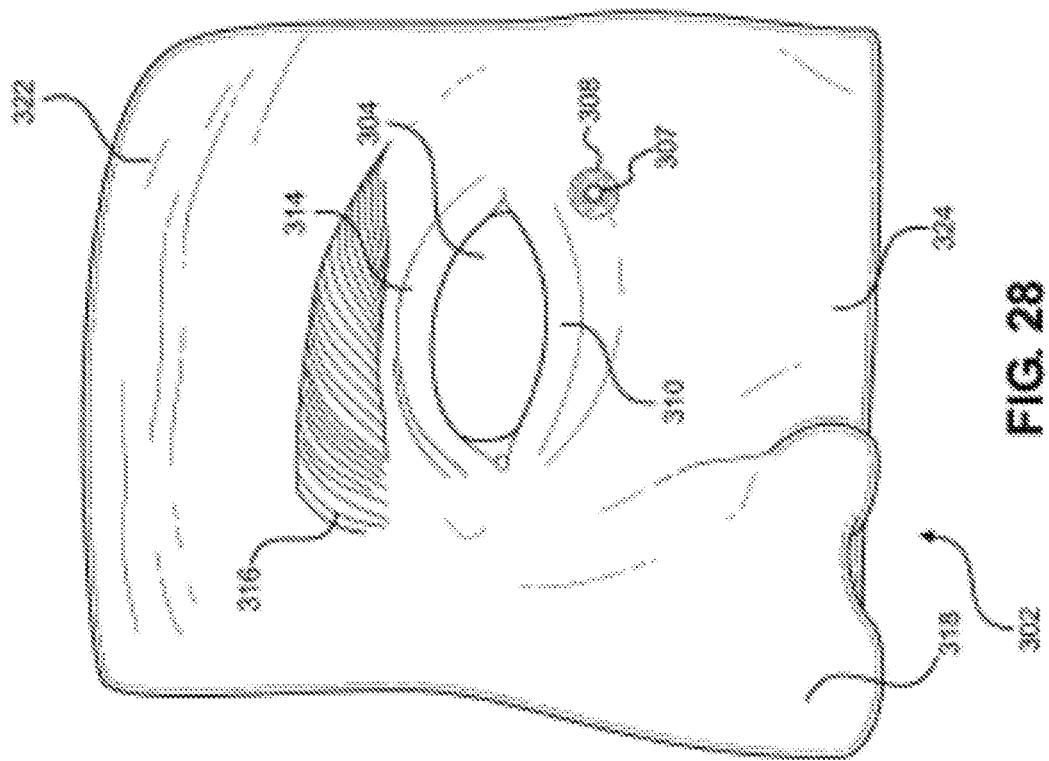
FIG. 28 is a front view of the simulated skin covering of an alternative embodiment of the lateral canthotomy and cantholysis simulation device, showing an eye opening, simulated skin covering, upper and lower eyelids, brow, partial nose, partial forehead, partial cheek, and skin plug receiver with first plug opening, according to one embodiment of the disclosure.

According to one embodiment, the Lateral Canthotomy and Cantholysis Simulation Device 300 has a base 320 (shown in detail in FIGS. 30 and 31) covered by a skin covering 302 (shown in detail in FIGS. 28 and 29). A plug 352 may be used to simulate the canthal tendon by a mechanism described below. The plug 352 comprises a plug head 305 and plug band 350 (shown in FIG. 34).

The alternative embodiment of the Lateral Canthotomy and Cantholysis Simulation Device 300 as shown in FIG. 27, is in a tensioned configuration, which is evidenced by the bulging of the simulated eye 312 through eye opening 304 mimicking proptosis. The tensioned configuration of the alternative embodiment of the Lateral Canthotomy and Cantholysis Simulation Device 300 of the current disclosure will be discussed with FIG. 35.

Referring to FIGS. 28 and 29, the skin covering 302 of the alternative embodiment of the Lateral Canthotomy and Cantholysis Simulation Device 300 is shown. The skin covering 302 depicts an upper right corner of a human face, including a partial forehead 322, brow 316, partial cheek 324, and partial nose 318. The bottom lid 310 and upper lid 314 of the skin covering 302 form an eye opening 304 where the simulated eye 312 is partially exposed when device is in use. While this alternative embodiment of the Lateral Canthotomy and Cantholysis Simulation Device 300 includes a skin covering 302 that shows only a portion of a face, any portion of the human face may be used, so long as it includes a simulated eye 312 or any depiction of the human eye and area immediately surrounding the human eye. Further, the alternative embodiment of the Lateral Canthotomy and Cantholysis Simulation Device 300 can also be used without the skin covering 302 without deviating from the scope and spirit of the disclosure.

The skin covering 302 further comprises a plug head receiver 308 and a first plug opening 307 located on the lower lateral corner of the eye opening 304. The plug head receiver 308 is a depression formed to receive the plug head 305 of plug 352 (As shown in FIG. 27 and discussed further in FIGS. 33 and 34). When the Lateral Canthotomy and Cantholysis Simulation Device 300 is assembled, the first plug opening 307 corresponds with a second plug opening 334 formed into base 320 (subsequently discussed in FIGS. 30 and 31).

The skin covering 302 is made of synthetic skin material, including but not limited to, silicone, rubber, or neoprene. The skin covering 302 is used to simulate a realistic patient in both touch and sight, and may be pigmented to make the skin covering 302 more realistic. The skin covering 302 may be made of multiple layers to simulate various layers that comprise human skin. In addition, the skin covering 302 may include various simulated injuries, including, but not limited to, scrapes, cuts, burns, wounds, etc.

FIG. 29 is a back perspective view of the skin covering 302 showing the interior 303 of skin covering 302 with the first plug opening 307 and eye opening 304 visible from the interior 303 of the skin covering 302. The interior sides of skin covering 302 are formed with three (3) indents 319 that correspond to three (3) detents 323 on base 320 (shown, for example, in FIG. 30). The indents 319 and detents 323 temporarily secure skin covering 302 to base 320. As with previous embodiments, indents 319 and detents 323 are used to secure the skin covering 302 to base 320. However, any mechanism known to those skilled in the art can be used to secure skin covering 302 to base 320.

Referring now to FIG. 30, the base 320 of the alternative embodiment of the Lateral Canthotomy and Cantholysis Simulation Device 300 of the current disclosure is shown.

The base 320 is substantially square in shape and can be made of various materials including, but not limited to, plastic, wood, silicone, etc. While FIG. 30 depicts base 320 as substantially square, the base 320 can be any shape or size and depict and portion of the human face.

Base 320 has a front side 325 and back side 340 (shown in FIG. 31). Base 320 also consists of four peripheral sides 341. As stated above, while FIG. 30 depicts base 320 as substantially square, base 320 can be any shape or size, and have various features mimicking the skeletal structure of the human face. In addition, base 320 may be any color, or may be designed to visually mimic the tissue under the skin.

On the front side 325 of base 320 is a depression 330 formed to receive the simulated eye 312. Base 320 is also formed with an eye hook aperture 332, located in the center of the depression 330. The eye hook aperture 332 extends from the depression 330 located on the front side 325 of base 320 to the back side 340 of base 320, allowing the eye hook to penetrate the base 320. The front 325 of base 320 is also formed with a brow ridge 328 and partial nose ridge 326 similar to that of a human skull, to provide structure to the skin covering 302 that covers the base 320 and to give a more realistic appearance. As stated above, base 320 can be formed with various skeletal structures of the human face, or depict no structures at all.

The base 320 is also formed with a second plug opening 334 located on the bottom right of the depression 330 on the front 325 of the base 320. Second plug opening 334 extends from the front side 325 of base 320 to the back side 340 of base 320; completely penetrating the base 320. While FIG. 30 depicts the second plug opening 334 as circular, the second plug opening 334 may be any shape or size, so long as it allows the plug band 350 to pass through and corresponds with the first plug opening's 307 position on the skin covering 302 when the device 300 is assembled.

Three (3) detents 323 are located on the peripheral sides 341 of base 320. The detents 323 are received by corresponding indents 319 located on the inside peripheral surface of the skin covering 302 (shown in 29) and used to secure the skin covering 302 to base 320. Although the mechanism used to temporarily secure skin covering 302 to base 320 are detents 323 and indents 319, any mechanism that is known in the art to temporarily secure skin covering 302 to base 320 may be used without deviating from the scope and spirit of the disclosure.

FIG. 31 shows the back side 340 of base 320. Formed into the back side 340 of base 320 is a cutout 336, which houses a mechanism used to simulate the lateral canthotomy and cantholysis, according to one embodiment of the disclosure. As shown the eye displacer may be embodied as mechanism integrated into the base 320 and configured to move the simulated eye 312 between the first position and the second position. For example, the eye displacer my generally include an arm (e.g., bending member 346) coupled to the base 320, a band interface (e.g., hook 349) configured to couple a band (e.g., plug band 350) to the arm, and an eye linkage (e.g., eye hook 338) coupling to the arm to the simulated eye 312 through at least a portion of the base.

Further, in displacing the simulated eye 312 between the first position and the second position, the eye linkage may be configured to hold the simulated eye in the outward direction via the arm when the band is coupled to the arm under tension and via the band interface, and the eye linkage may be further configured to retract the simulated eye in an inward direction via the arm when the band is severed, according to one embodiment of the disclosure.

As above, the eye displacer may be at least partly integrated with the base 320. In particular, the base 320 may include channels such as cutouts or recesses for positioning one or more portions of the eye displacer mechanism. To illustrate, the base may incorporate an arm channel (e.g., cutout 336), a band channel (e.g., second plug opening 334), and an eye linkage channel (e.g., hole 33). Accordingly and as shown the arm channel may include a cutout in the back of the base 320 of sufficient space to receive the arm and allow its movement (e.g., bending between its tensioned state and its relaxed state) as the simulated eye 312 moves from the first position and the second position. Similarly, the band channel may be configured to provide passage of the band from the front of the base 320 to the arm channel. Likewise, and the eye linkage channel may be configured to provide passage of the eye linkage from the arm channel to the front of the base.

According to the illustrated embodiment, the cutout 336 is rectangular in shape, and does not extend from the front side 325 of base 320 to the back side 340 of base 320. The cutout 336 extends from the second plug opening 334 on the back side 340 of base 320 located on the lower left corner to the upper right corner of the back side 340 of base 320. Eye hook aperture 332 extends from the front side 325 to the back side 340 of base 320; opening up on the back side 340 of base 320 at cutout 336. Other than the extended openings of the second plug opening 334 and the eye hook aperture 332, both of which extend from the front side 325 to the back side 340 of base 320, the cutout 336 does not extend from the back side 340 to the front side 325 of base 320.

While shown as extending from the lower left corner of the base 320 to the upper right corner of base 320, it should be understood by those skilled in the art that the cutout 336 can take multiple positions on the back of base 320, depending in the location of the second plug opening 334 and the shape and structure of eye hook 338. For example, the cutout 336 may extend horizontally from the second plug opening 334, not diagonally. This would require the eye hook 338 to have a different structure in order to utilize the device. 300

Within the cutout 336, a stationary member 347 and a bending member 346 are housed. The stationary member 347 is fixedly attached to the cutout 336. The stationary member 347 can be any shape or color, and made from various materials, including, but not limited to, plastic, metal, etc. As a non-limiting example, the stationary member 347 could be two metal disks welded together and fixedly attached to cutout 336.

The bending member 346 is a long piece of thin metal, having a first end 357 and a second end 348. The bending member 346 is fixedly attached to the stationary member 347 at the first end 357 and the second end 348 is formed with or attached to a hook 349. The bending member 346 is also formed with a hole 339 formed where bending member 346 is adjacent to eye hook 338. Hole 339 is formed to receive the eye hook 338 (shown in FIG. 32).

While described as a thin piece of metal, the bending member 346 may be formed from any appropriate material known to those stilled in the art that is capable of some flexibility or other provide for movement of the simulated eye between its simulated injury and correctly performed surgery. Some non-limiting examples of potential materials include plastic, metal, silicone, etc. The hook 349 of bending member 346 can be made of the same material as the bending member 346, or another material may be used to form hook 349, which is then attached to the bending member 346 by any means known to those skilled in the art.

As shown in FIG. 31, the first end 357 of the bending member 346 is fixedly attached to the stationary member 347. The bending member 346 can be attached to the stationary member 347 by various methods known by those skilled in the art. As a non-limiting example, the bending member 346 may be welded to the stationary member 347.

In FIG. 31, base 320 of the alternative embodiment of the Lateral Canthotomy and Cantholysis Simulation Device 300 of the current disclosure is in a relaxed configuration, with the bending member 346 not in a tensioned state and with the eye hook 338 and simulated eye 312 removed for clarification.

FIG. 32 is a cross-sectional view of FIG. 31 taken along like 32-32 with the simulated eye 312 positioned directly adjacent to depression 330 of base 320 and the eye hook 338 assembled. The skin covering 302 and plug 352 are not shown.

Simulated eye 312 is attached to eye hook 338; eye hook 338 having a first end 337 and a second end 335. The first end 337 is passed through the bending member 346 through hole 339 and through the eye hook aperture 332 of base 320. The eye hook 338 is then attached to simulated eye 312 by some mechanism. For a non-limiting example, the eye hook 338 may be attached to simulated eye 312 by an adhesive, or a screw-like mechanism on eye hook 338 which corresponds to a screw-like mechanism on simulated eye 312. The second end 335 is formed into a hook, which hooks around the bending member 346. Thus, because of the eye hook's 338 position, the eye hook 338 moves with the bending member 346 depending on the configuration of the device 300 and whether the device 300 is in a tensioned or relaxed configuration.

As depicted in FIG. 32, the alternative embodiment of the Lateral Canthotomy and Cantholysis Device 300 is in a relaxed configuration and not in a tensioned configuration. In the relaxed configuration, the bending member 346 is not bending in any direction and not experiencing any tension. In the relaxed configuration, the bending member 346 keeps the simulated eye 312 approximately directly adjacent to depression 330. The relaxed configuration depicts the simulated eye 312 as a normal eye in a patient would be, with the simulated eye 312 within the eye socket, which is analogous to the depression 330. In is understood that tensioned and relaxed configurations indicate, reflect, or otherwise correspond to the simulated ocular injury and the correctly performed ocular surgery.

Figure 33:
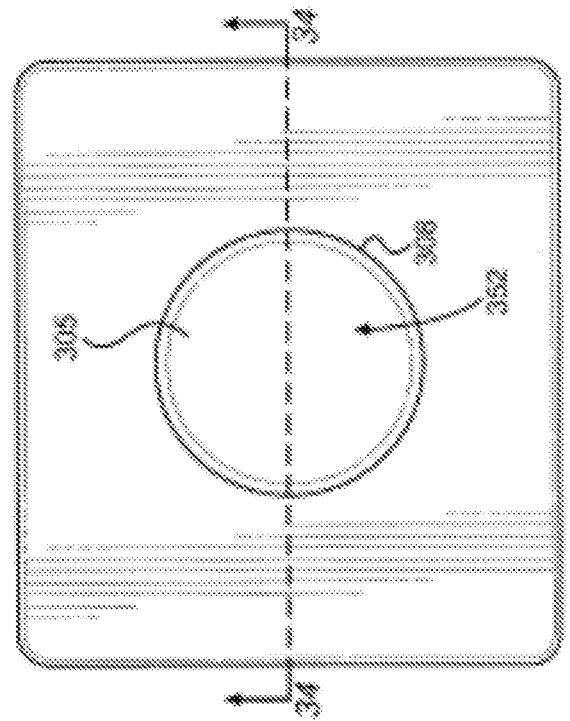
FIG. 33 is a magnified view of the plug of FIG. 27, showing plug head flushed against the skin covering, according to one embodiment of the disclosure.

FIG. 33 is an expanded view of the plug head 305 and plug head receiver 308 of the skin covering 302, as depicted in FIG. 27, when the device 300 is in a tensioned state, assembled, and ready for use. The alternative embodiment of the Lateral Canthotomy and Cantholysis Simulation Device 300 of the present disclosure utilizes a plug 352 to mimic the canthal tendon.

Figure 34:
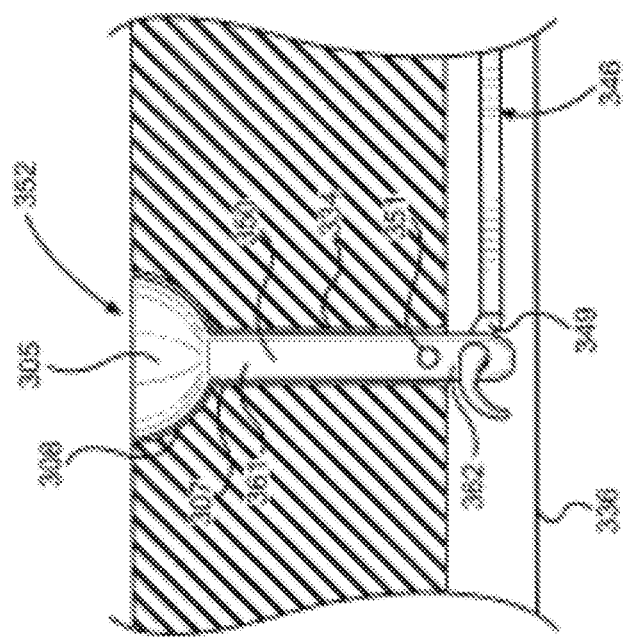
FIG. 34 is a cross-sectional view of FIG. 33 taken along line 34-34, showing the plug with a plug head and plug band, the plug band formed with a plurality of hook receivers, one of which has received the hook of the bending member, according to one embodiment of the disclosure.

To prepare the alternative embodiment of the Lateral Canthotomy and Cantholysis Device 300 for use, the plug head 305 is received by the plug head receiver 308. As shown in FIG. 28, the plug head receiver 308 is hemispherical in shape, which corresponds to the shape of the plug head 305 (as shown in FIG. 34). When in use, the plug head 305 is flushed against the skin covering 302, to simulate human skin as realistically as possible. The plug head 305 can be the same color, and made of the same material as the skin covering 302 in order to simulate human skin as much as possible. However, it is not out of the scope or spirit of the present disclosure to have the plug head 305 formed of a different material and/or color. Further, the plug head 305 and plug band 350 may be formed of different materials or the same material.

FIG. 34 is a cross-sectional view of FIG. 33 taken along line 34-34. FIG. 34 shows the plug 352 in use. The plug 352 is formed with a plug head 305 and plug band 350. As stated above, the plug head 305 has a hemispherical shape. While shown as hemispherical, the plug head 305 may be any shape of size desired by the user so long as the shape and size prevents the plug head 305 from being pulled through the first plug opening 307 or second plug opening.

As stated above, plug band 350 has a first end 361 and a second end 362. To assemble, the second end 362 of plug band 350 is pulled through first plug opening 307 of skin covering 302 and through second plug opening 334 formed into base 320. While the first end 361 of the plug band 350 is attached to or formed into the plug head 305, the second end 362 of the plug band 350 is formed with a plurality of hook receivers 351. The hook receivers 351 receive hook 349 of the bending member 346, as shown by FIG. 34.

After the plug band 350 is pulled through first plug opening 307 of skin covering 302 and then through second plug opening 334 formed into base 320, the plug band 350 is stretched and the bending member 346 bends slightly towards the plug band 350 from the point attached to the stationary member 347, which serves as a stationary axis, to allow the hook 349 to be received within the hook receivers 351. The plug head 305 prevents the plug 352 from being pulled through the first plug opening 307. This is the tensioned configuration of the alternative embodiment of the Lateral Canthotomy and Cantholysis Simulation Device 300, which will be further discussed in FIG. 35.

FIG. 35 is the cross-sectional view of FIG. 27 taken along line 35-35, showing the alternative embodiment of the Lateral Canthotomy and Cantholysis Simulation Device 300 in a tensioned configuration and ready for use. As described above, the plug band 350 is pulled through first plug opening 307 of skin covering 302 and then through second plug opening 334 formed into base 320. The plug head 305 prevents the plug 352 from being pulled through the first 307 and second 334 plug openings. The plug band 350 is stretched and due to the tensioned state of the plug band 350, the bending member 346 is bent towards the plug band 350 from axis stationary member 347, to allow the hook 349 to be received within the hook receivers 351. This is the tensioned state of the alternative embodiment of the Lateral Canthotomy and Cantholysis Simulation Device 300.

As discussed previously, movement of the bending member 346 causes movement in the simulated eye 312 in the same direction, as eye hook 338 is attached to bending member 346. FIG. 35 shows the simulated eye 312 when the alternative embodiment is in a tensioned state. Because the eye hook 338 is threaded through the hook aperture 332 formed into base 320 and through hole 339 of bending member 346, when the bending member 346 is in the tensioned configuration and moved towards the base 320 (as shown by directional arrow 366), the simulated eye 312 is pushed away from the depression 330 (as shown by directional arrow 368), simulating proptosis of the patient's eye. A spring (not shown) may also be positioned between the bending member 346 and the cutout 336 of base 320 in order to increase the tension in the bending member 346.

Figure 36:
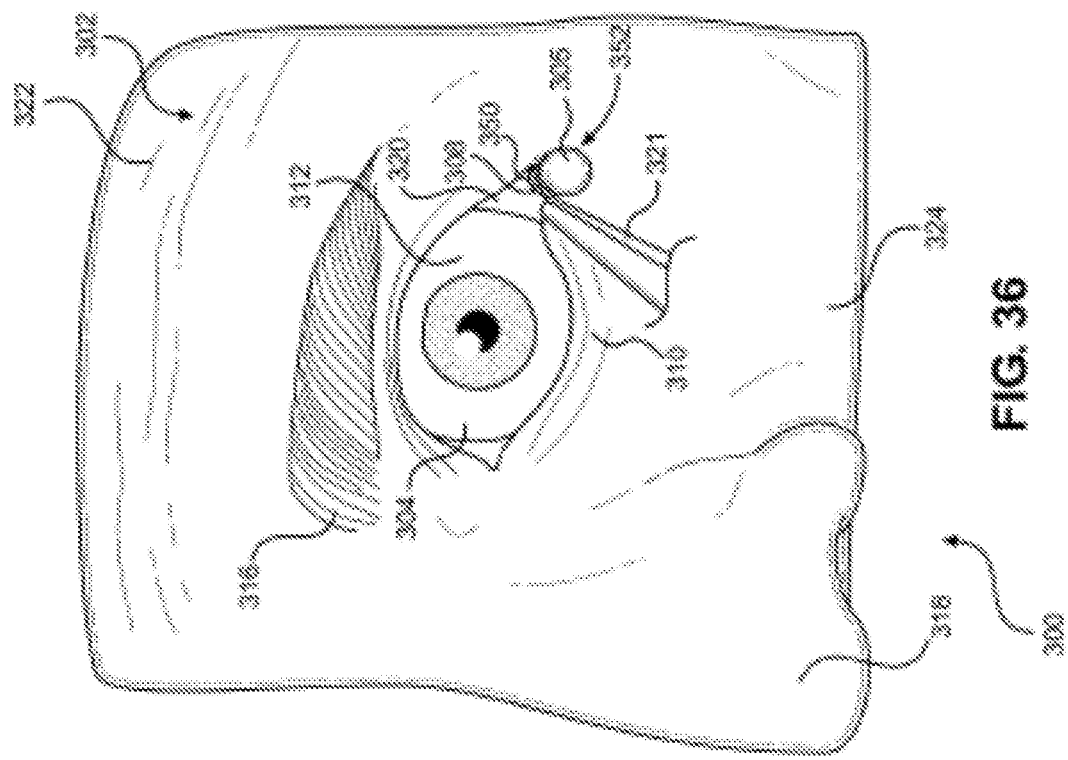
FIG. 36 is a front view of the simulation device of the present disclosure in use, showing a tweezer pulling the lower lid of the skin covering away from the base and exposing the plug band between the skin covering and the base, according to one embodiment of the disclosure.

FIG. 36 shows a preferred method for performing the lateral canthotomy and cantholysis. As shown, the lateral canthotomy and cantholysis can be performed in different ways. Here, a tweezer 321 can be used to peel the lower lid 310 away from the simulated eye 312, exposing the plug band 350, between the skin covering 302 and base 320. The plug band 350 is then cut to simulate cutting the canthal tendon. Once the plug band 350 is cut, the alternative embodiment of the Lateral Canthotomy and Cantholysis Simulation Device 300 is no longer in a tensioned state.

Another method of performing the lateral canthotomy and cantholysis would be to lift the plug head 305 away from the skin covering 302 and cutting the plug band 350 once it is exposed.

FIG. 37 shows the resulting change from the tensioned configuration (as shown in FIG. 35) to a relaxed configuration, according to one embodiment of the disclosure. As depicted by the Figure, once the plug band 350 has been cut, the bending member 346 moves into a relaxed state as shown by directional arrow 363. As stated above and shown in FIG. 35, because the eye hook 338 is threaded through hole 339 of bending member 346, when the bending member 346 is released from the tensioned configuration, the simulated eye 312 moves towards the depression 330 as shown by directional arrow 364, simulating the release of the fluid buildup behind the eye, which caused the proptosis and the eye returning to a more normal position.

After the simulated lateral canthotomy and cantholysis is performed, the plug 352 is removed and discarded. Because the plug can be used, discarded, and replaced with a new plug, the alternative embodiment of the Lateral Canthotomy and Cantholysis Simulation Device 300 of the present disclosure can be used repeatedly without requiring replacement of skin covering 302 or base 320.

While there have been shown what are presently considered to be preferred embodiments of the present disclosure, it will be apparent to those skilled in the art that various changes and modifications can be made herein without departing from the scope and spirit of the disclosure. Further, the above description of the various embodiments is provided to enable a person of ordinary skill in the art to make or use the subject matter of the disclosure. Various modifications to the embodiments will be readily apparent to those skilled in the art, and the generic principles defined herein may be applied to other variations without departing from the spirit or the scope of this disclosure. Thus, it is to be understood that the disclosure is not intended to be limited to the examples and designs described herein, which merely represent a presently preferred implementation of the disclosure, but that the disclosure is to be accorded the widest scope consistent with the principles and novel features disclosed herein. It is to be further understood that the scope of the present disclosure fully encompasses other embodiments that may become obvious to those skilled in the art.

The invention claimed is:

1. A device for ocular surgery training, the device comprising:
a simulated eye;
a base configured to receive the simulated eye;
a simulated skin configured to attach to the base and at least partially cover the simulated eye, the simulated skin having an outward surface depicting an area immediately surrounding a human eye, the simulated skin including an eye opening configured to expose at least a portion of the simulated eye through said eye opening when the simulated skin is attached to the base;
an eye displacer configured to displace the simulated eye from a first position to second position, the first position corresponding to an ocular injury and the second position indicating a properly performed ocular surgery;
a band configured to hold the simulated eye in the first position via the eye displacer when the band is intact, the band further configured to release the simulated eye from the first position when the band is severed, allowing the simulated eye to move to the second position via the eye displacer.

2. The device of claim 1, wherein the ocular surgery includes a lateral canthotomy and cantholysis (LCC);
wherein the simulated skin covering includes a simulated canthus;
wherein the first position of the eye displacer further corresponds to proptosis with the simulated eye bulging in an outward direction; and
wherein the band is configured to simulate a canthal tendon.

3. The device of claim 2, wherein the simulated eye is formed as an eyeball; and
wherein the base includes an eye socket; and
wherein the eyeball is displaced from the eye socket a predetermined distance from the eye socket when the simulated eye is in the first position.

4. The device of claim 2, wherein the eye displacer includes an arm coupled to the base, a band interface configured to couple the band to the arm, and an eye linkage coupling to the arm to the simulated eye through at least a portion of the base, the eye linkage configured to hold the simulated eye in the outward direction via the arm when the band is coupled to the arm under tension and via the band interface, and the eye linkage further configured to retract the simulated eye in an inward direction via the arm when the band is severed.

5. The device of claim 4, wherein the base has a front corresponding to the outward direction and a back opposite the front, the base including an arm channel, a band channel, and an eye linkage channel, the arm channel including a cutout in the back of the base of sufficient space to receive the arm and allow its movement as the simulated eye moves from the first position and the second position, the band channel configured to provide passage of the band from the front of the base to the arm channel, and the eye linkage channel configured to provide passage of the eye linkage from the arm channel to the front of the base.

6. The device of claim 5, wherein the band is further configured to be anchored in the simulated skin, opposite the band interface, when the band is coupled to the arm via the band interface.

7. The device of claim 6, wherein the band includes an enlarged anchor-end having an appearance of as at least one of a skin injury or injury related debris embedded in the simulated skin; and
wherein the simulated skin includes a band interface having a recessed area in an outer surface of the simulated skin combined with a passageway through the simulated skin, the band interface configured to receive and retain the enlarged anchor-end of the band while providing passage for a rest of the band.

8. The device of claim 4, wherein the band is configured to attach to the band interface in at plurality of attach points such that each attach point provides a different tension in the band when the band is coupled to the arm.

9. The device of claim 2, wherein the simulated canthus of the simulated skin includes a precut incision covered by a replaceable adhesive cover.

10. The device of claim 1, wherein the simulated skin includes one or more facial features including at least a partial forehead, a partial brow, a partial cheek, and a partial nose.

11. The device of claim 10, wherein the base includes one or more human skull features including at least one brow ridge and a partial nose ridge.

12. The device of claim 1, wherein the simulated skin includes one or more simulated facial injuries, including a burn injury.

13. A device for ocular surgery training, the device comprising:
- a simulated eye;
- a base configured to receive the simulated eye;
- a simulated skin configured to attach to the base, the simulated skin including an eye opening configured to expose at least a portion of the simulated eye when the simulated skin is attached to the base;
- means to displace the simulated eye from a first position to second position, the first position corresponding to an ocular injury and the second position indicating a properly performed ocular surgery;
- a band configured to hold the simulated eye in the first position via the means to displace the simulated eye when the band is intact, the band further configured to release the simulated eye from the first position when the band is cut, allowing the simulated eye to move to the second position via the means to displace the simulated eye.

14. The device of claim 13, wherein the ocular surgery includes a lateral canthotomy and cantholysis (LCC);
- wherein the simulated skin covering includes a simulated canthus;
- wherein the first position of the means to displace the simulated eye corresponds to a proptosis with the simulated eye bulging in an outward direction; and
- wherein the band is configured to simulate a canthal tendon.

15. The device of claim 14, wherein the band is configured to attach to both the simulated skin and to the means to displace the simulated eye, the band further configured to hold the simulated eye in the first position via the means to displace the simulated eye when attached to both the simulated skin and to the means to displace the simulated eye, the band further configured to be anchored in the simulated skin, opposite the band interface, when the band is coupled to the arm via the band interface.

16. The device of claim 14, wherein the eye displacer includes an arm coupled to the base, a band interface configured to couple the band to the arm, and an eye linkage coupling to the arm to the simulated eye through at least a portion of the base, the eye linkage configured to hold the simulated eye in the outward direction via the arm when the band is coupled to the arm under tension and via the band interface, and the eye linkage further configured to retract the simulated eye in an inward direction via the arm when the band is cut; and
- wherein the base has a front corresponding to the outward direction and a back opposite the front, the base including an arm channel, a band channel, and an eye linkage channel, the arm channel including a cutout in the back of the base of sufficient space to receive the arm allow its movement as the simulated eye moves from the first position and the second position, the band channel configured to provide passage of the band from the front of the base to the arm channel, and the eye linkage channel configured to provide passage of the eye linkage from the arm channel to the front of the base.

17. The device of claim 14, wherein the simulated skin includes one or more facial features including at least a partial forehead, a partial brow, a partial cheek, and a partial nose; and
- wherein the base includes one or more human skull features including at least one brow ridge and a partial nose ridge.

18. A device for lateral canthotomy and cantholysis training, the device comprising:
- a simulated eye;
- a base configured to receive the simulated eye;
- a simulated skin configured to attach to the base and at least partially cover the simulated eye, the simulated skin having an outward surface depicting an area immediately surrounding a human eye, the simulated skin including an eye opening and a simulated canthus, the eye opening configured to expose at least a portion of the simulated eye through said eye opening when the simulated skin is attached to the base;
- an eye displacer coupled to the base and configured to displace the simulated eye from a first position to second position, the first position corresponding to an injured eye and the second position corresponding to a properly performed ocular surgery;
- a band configured to simulate a canthal tendon and to hold the simulated eye in the first position via the eye displacer when the band is intact, the band further configured to release the simulated eye from the first position when the band is severed, allowing the simulated eye to move to the second position via the eye displacer.

19. The device of claim 18, the first position of the eye displacer further corresponds to proptosis with the simulated eye bulging in an outward direction, the eye displacer including an arm coupled to the base, a band interface configured to couple the band to the arm, and an eye linkage coupling to the arm to the simulated eye through at least a portion of the base, the eye linkage configured to hold the simulated eye in the first position via the arm when the band is coupled to the arm under tension and via the band interface, and the eye linkage further position the simulated eye in the second position via the arm when the band is severed.

20. The device of claim 19, wherein the simulated skin includes one or more facial features including at least a partial forehead, a partial brow, a partial cheek, and a partial nose, the simulated skin further including one or more simulated facial injuries, including a burn injury; and
- wherein the base includes one or more human skull features including at least one brow ridge and a partial nose ridge.

* * * * *

UNITED STATES PATENT AND TRADEMARK OFFICE
CERTIFICATE OF CORRECTION

Page 1 of 1

PATENT NO. : 10,977,962 B2
APPLICATION NO. : 16/855968
DATED : April 13, 2021
INVENTOR(S) : Segall It is certified that error appears in the above-identified patent and that said Letters Patent is hereby corrected as shown below:

On the Title Page

In (54), Title:
Change "LATERAL CATHOTOMY AND CANTHOLYSIS SIMULATION DEVICE" to
--LATERAL CANTHOTOMY AND CANTHOLYSIS SIMULATION DEVICE--

In the Specification

In Column 1, Lines 1-2, Title:
Change "LATERAL CATHOTOMY AND CANTHOLYSIS SIMULATION DEVICE" to
--LATERAL CANTHOTOMY AND CANTHOLYSIS SIMULATION DEVICE--

In Column 1, Lines 7-17, CROSS-REFERENCE TO RELATED APPLICATION:
Change "This application is a continuation of currently pending U.S. patent application Ser. No. 15/642,136, filed Jul. 5, 2017 and entitled "Lateral Cathotomy And Cantholysis Simulation Device"; which is a continuation-in-part of U.S. patent application Ser. No. 15/345,008, filed Nov. 7, 2016 and entitled "Lateral Cathotomy And Cantholysis Simulation Device" which has issued as U.S. Pat. No. 10,325,524 on Jun. 18, 2019; and in turn claims benefit to U.S. provisional application No. 62/252,458 filed on Nov. 7, 2015; all of which are incorporated by reference herein in their entirety." to --This application is a continuation of currently pending U.S. patent application Ser. No. 15/642,136, filed Jul. 5, 2017 and entitled "Lateral Canthotomy And Cantholysis Simulation Device"; which is a continuation-in-part of U.S. patent application Ser. No. 15/345,008, filed Nov. 7, 2016 and entitled "Lateral Canthotomy And Cantholysis Simulation Device" which has issued as U.S. Pat. No. 10,325,524 on Jun. 18, 2019; and in turn claims benefit to U.S. provisional application No. 62/252,458 filed on Nov. 7, 2015; all of which are incorporated by reference herein in their entirety.--

Signed and Sealed this
Sixth Day of July, 2021

Drew Hirshfeld
*Performing the Functions and Duties of the
Under Secretary of Commerce for Intellectual Property and
Director of the United States Patent and Trademark Office*